US006760328B1

(12) United States Patent
Ofek

(10) Patent No.: US 6,760,328 B1
(45) Date of Patent: Jul. 6, 2004

(54) SCHEDULING WITH DIFFERENT TIME INTERVALS

(75) Inventor: Yoram Ofek, Riverdale, NY (US)

(73) Assignee: Synchrodyne Networks, Inc., Riverdale, NY (US)

(*) Notice: Subject to any disclaimer, the term of this patent is extended or adjusted under 35 U.S.C. 154(b) by 0 days.

(21) Appl. No.: 09/418,279

(22) Filed: Oct. 14, 1999

(51) Int. Cl.[7] .......................... H04L 12/28; H04L 12/56

(52) U.S. Cl. ...................................... 370/389; 370/503

(58) Field of Search ................................ 370/389, 503, 370/517, 252, 253, 465, 519, 353, 356, 357, 369, 375, 376, 347, 400, 401, 395.4, 468

(56) References Cited

U.S. PATENT DOCUMENTS

| 4,926,418 | A | * | 5/1990 | Cidon et al. ................. | 370/455 |
|---|---|---|---|---|---|
| 4,979,165 | A | * | 12/1990 | Dighe et al. ................. | 370/416 |
| 6,038,230 | A | * | 3/2000 | Ofek ........................... | 370/389 |
| 6,055,246 | A | * | 4/2000 | Jones .......................... | 370/503 |
| 6,181,687 | B1 | * | 1/2001 | Bisdikian .................... | 370/347 |
| 6,246,702 | B1 | * | 6/2001 | Fellman et al. ............. | 370/503 |
| 6,272,131 | B1 | * | 8/2001 | Ofek ........................... | 370/389 |
| 6,330,236 | B1 | * | 12/2001 | Ofek et al. .................. | 370/389 |
| 6,396,843 | B1 | * | 5/2002 | Chiussi et al. .............. | 370/418 |
| 2002/0080829 | A1 | * | 6/2002 | Ofek et al. .................. | 370/539 |

OTHER PUBLICATIONS

R.W. Kembel, "The FibreChannel Consultant: Arbitrated Loop", Connectivity Solutions, Tucson, AZ, Chapters 1 and 2, pp. 1–47.
W. Stallings, "ISDN An Introduction", MacMilliam Publishing Co., NY (1989), pp. 119–122.
P. Dana, "Global Positioning System (GPS) Time Dissemination for Real–Time Applications", Real–Time Systems, 12, 9–40 (1997), Kluwer Academic Publishers, Boston, MA, pp. 9–40.
A. Jacob, "A Survey of Fast Packet Switches", Computer Committee Review, IEEE, Jan. 1990, pp. 54–64.
A.G. Fraser, "Early Experiments with Asynchronous Time Division Networks", IEEE Networks, Jan. 1993, pp 12–26.
M. Hamdi et al., "Voice Service Interworking for PSTN and IP Networks", IEEE Communications Magazine, May 1999, pp 104–111.

(List continued on next page.)

*Primary Examiner*—Ajit Patel
*Assistant Examiner*—Chirag Shah
(74) *Attorney, Agent, or Firm*—Sitrick & Sitrick

(57) ABSTRACT

The invention describes a method for transmitting data packets over a packet switching network with widely varying link speeds. The switches of the network maintain a common time reference (CTR). Each switch along a route from a source to a destination forwards data packets in periodic time frames (TFs) of a plurality of durations that are predefined using the CTR. The time frame duration can be longer than the time duration required for transmitting a data packet, in which case the exact position of a packet in the time interval is not predetermined. In accordance with the present invention, different time frame intervals: TF1, TF2, and so on are used for forwarding over links with different capacities. Employing different time frame intervals is useful in heterogeneous networks with widely varying link speeds, since the number of bytes that can be transmitted during one time frame of one of, for example, 500/125/62.5/ 12.5 microseconds changes according to the link capacity and various other system parameters and considerations, such as, maximum data packet size. When the transmission of a data packet cannot be completed before the beginning of the next time frame, a time-driven preemption priority can be used in order to ensure the timely transmission of real-time data packet before "best effort" data packets. When the transmission of a data packet cannot be completed in its current time frame the transmission of this data packet can continue in the following time frames.

43 Claims, 18 Drawing Sheets

OTHER PUBLICATIONS

J.C. Bellamy, "Digital Network Synchronization", IEEE Communications Magazine, Apr. 1995, pp. 70–83.

E.W. Zegura, "Architectures for ATM Switching Systems", IEEE Communications Magazine, Feb. 1993, pp. 28–37.

A. Pattavina, "Nonblocking Architectures for ATM Switching", IEEE Communications Magazine, Feb. 1993, pp. 38–48.

*Serial Storage Architecture A Technology Overview*, version 3.0, SSA Industry Association 1995, pp. 1–43.

Y. Ofek, "Overview of the MetaRing Architecture", *Computer Networks and ISDN Systems*, vol. 26 (1994), pp. 817–829.

M. Baldi, et al., "End–to–End Delay Analysis of Videoconferencing Over Packet Switched Networks", IEEE Infocom, Jan. 29, 1998, Title page and pp. 1–27.

S.J.Golestani, "A Framing Strategy for Congestion Management", *IEEE Journal on Selected Areas in Communications*, vol. 9, No. 7, Sep. 1991, pp. 1064–1077.

Li et al., "Pseudo–isonchronous Cell Forwarding", *Computer Networks and ISDN Systems*, vol. 30 (1998), pp. 2359–2372.

Li et al, "Time–driven Priority Flow Control for Real–time Heterogeneous Internetworking", *Proceedings of Infocom*, vol. 15, Los Alamitos, CA, Mar. 1996. pp. 189197.–.

* cited by examiner

| 4B/5B encoding scheme | | |
|---|---|---|
| HEX DATA | 4-bit Binary Data | 5-bit Encoded Data Codeword |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

| 4B/5B encoding scheme | | |
|---|---|---|
| Control Input | | 10-bit Encoded Control Codeword |
| HEX DATA | Binary Data | |
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

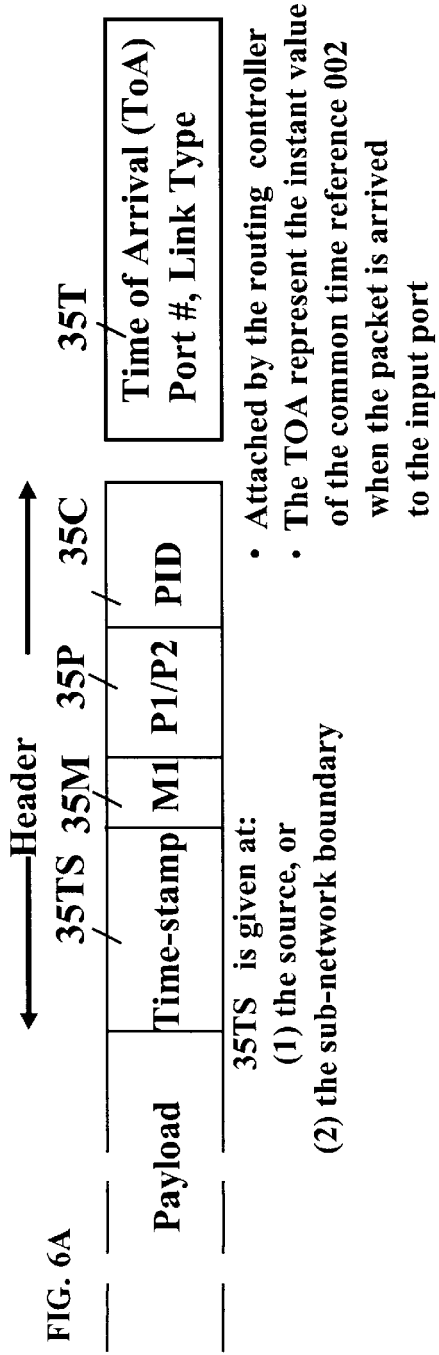

- Two time intervals:
  - $k1> TF1 = 1$ UTC second
  - $k2> TF2 = 1$ UTC second
  - $TF2 = (k1/k2) * TF1 = k * TF1$, where the time cycles of $TF1$ and $TF2$ are aligned with respect to UTC, and thus, for $k = 2$:

FIG. 17A
Control signal pairs:
- Start *i* (data packet) - End *i* (data packet)
- Preempt *j* (data packet) - Resume *j* (data packet) or
  Abort *j* (data packet)
- The control signal pairs can be realized using the 10-bit control codewords of the 4B/5B coding scheme
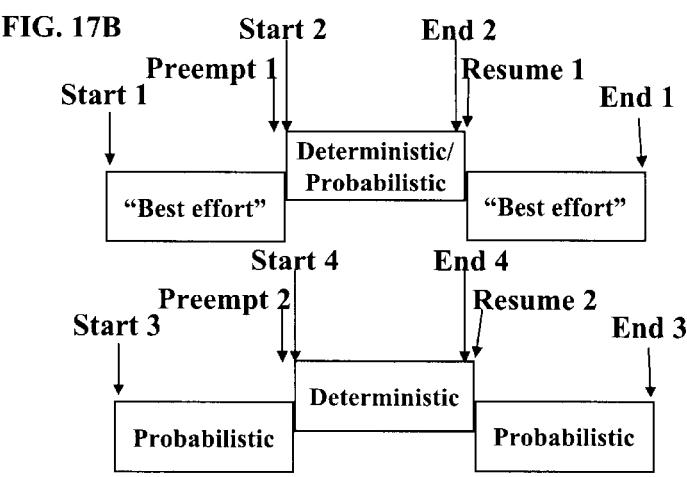
FIG. 17B
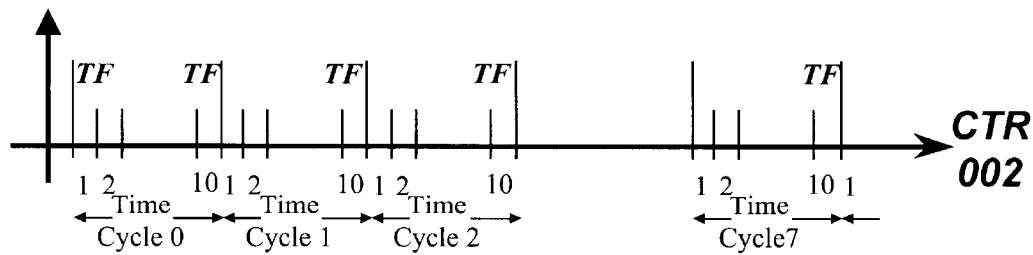
FIG. 17C

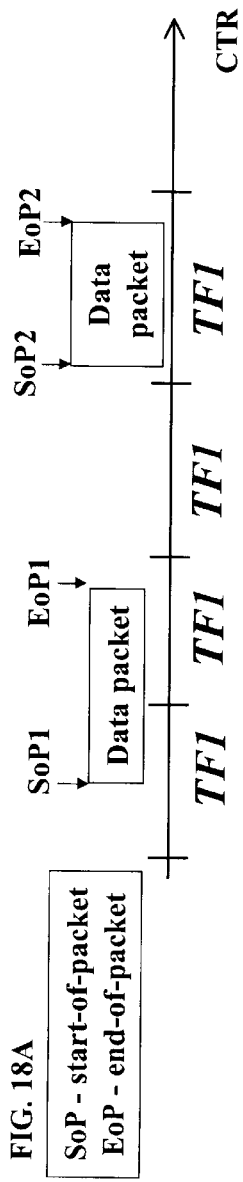
FIG. 18A
SoP - start-of-packet
EoP - end-of-packet
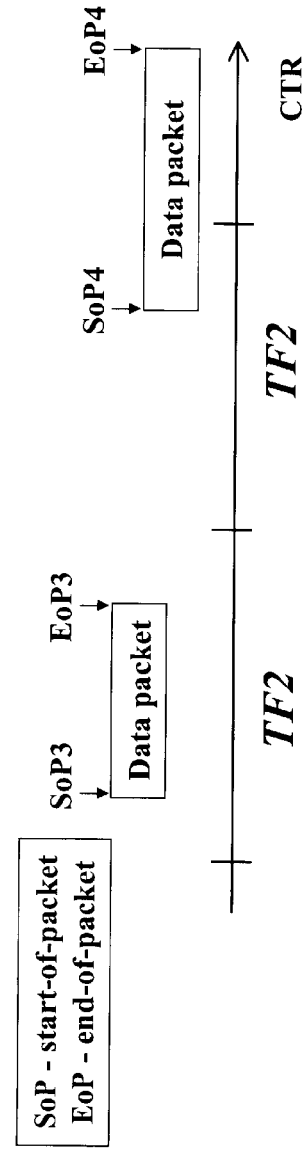
FIG. 18B
SoP - start-of-packet
EoP - end-of-packet
FIG. 18C
Operation: the time-of-arrival (ToA) is determined by SoP - start-of-packet - time, then the operation of the controllers at the input and output is as previously described

SCHEDULING WITH DIFFERENT TIME INTERVALS

RELATED APPLICATIONS

FEDERALLY SPONSORED RESEARCH OR DEVELOPMENT

Not Applicable.

BACKGROUND OF THE INVENTION

This invention relates to generally to a method and apparatus for transmitting of data on a communications network. More specifically, this invention relates to timely forwarding and delivery of data over the network and to their destination nodes. Consequently, the end-to-end performance parameters, such as, loss, delay and jitter, have either deterministic or probabilistic guarantees.

The proliferation of high-speed communications links, fast processors, and affordable, multimedia-ready personal computers brings about the need for wide area networks that can carry real-time data, like telephony and video. However, the end-to-end transport requirements of real-time multimedia applications present a major challenge that cannot be solved satisfactorily by current networking technologies. Such applications as video teleconferencing, and audio and video group (many-to-many) multicasting generate data at a wide range of bit rates and require predictable, stable performance and strict limits on loss rates, end-to-end delay bounds, and delay variations ("jitter"). These characteristics and performance requirements are incompatible with the services that current circuit and packet switching networks can offer.

Circuit-switching networks, which are still the main carrier for real-time traffic, are designed for telephony service and cannot be easily enhanced to support multiple services or carry multimedia traffic. Its synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases [John C. Bellamy, "Digital Network Synchronization", *IEEE Communications Magazine*, April 1995, pages 70–83].

Packet switching networks like IP (Internet Protocol)—based Internet and Intranets [see, for example, A. Tannebaum, *Computer Networks* (3rd Ed) Prentice Hall, 1996] and ATM (Asynchronous Transfer Mode) [see, for example, Handel et al., *ATM Networks: Concepts, Protocols, and Applications* (2nd Ed.) Addison-Wesley, 1994] handle bursty data more efficiently than circuit switching, due to their statistical multiplexing of the packet streams. However, current packet switches and routers operate asynchronously and provide best effort service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception.

Efforts to define advanced services for both IP and ATM have been conducted in two levels: (1) definition of service, and (2) specification of methods for providing different services to different packet streams. The former defines interfaces, data formats, and performance objectives. The latter specifies procedures for processing packets by hosts and switches/routers. The types of services that defined for ATM include constant bit rate (CBR), variable bit rate (VBR) and available bit rate (ABR).

The methods for providing different services under packet switching fall under the general title of Quality of Service (QoS). Prior art in QoS can be divided into two parts: (1) traffic shaping with local timing without deadline scheduling, for example [Demers et al., "Analysis and Simulation Of A Fair Queuing Algorithm", *ACM Computer Communication Review* (SIGCOMM'89), pages 3–12, 1989; S. J. Golestani, "Congestion-Free Communication In High-Speed Packet Networks", *IEEE Transcripts on Communications*, COM-39(12):1802–1812, December 1991; Parekh et al., "A Generalized Processor Sharing Approach To Flow Control—The Multiple Node Case", *ACM Transactions on Networking*, 2(2):137–150, 1994], and (2) traffic shaping with deadline scheduling, for example [Ferrari et al., "A Scheme For Real-Time Channel Establishment In Wide-Area Networks", *IEEE Journal on Selected Areas in Communication*, SAC-8(4):368–379, April 1990]. Both of these approaches rely on manipulation of local queues by each router with little or no coordination with other routers. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The real-time transport protocol (RTP) [H. Schultzrinne et. al, "RTP: A Transport Protocol for Real-Time Application"s, *IETF Request for Comment RFC*1889, January 1996] is a method for encapsulating time-sensitive data packets and attaching to the data time related information like time stamps and packet sequence number. RTP is currently the accepted method for transporting real-time streams over IP internetworks and packet audio/video telephony based on ITU-T H.323.

One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87-1343, May 1987], which also relates to how to integrate packet telephony using synchronization [Y. Ofek, "Integration Of Voice Communication On A Synchronous Optical Hypergraph", *IEEE INFOCOM'88*, 1988]. In the synchronous optical hypergraph, the forwarding is performed over hyper-edges, which are passive optical stars. In [Li et al., "Pseudo-Isochronous Cell Switching In ATM Networks", *IEEE INFOCOM'94*, pages 428–437, 1994; Li et al., "Time-Driven Priority: Flow Control For Real-Time Heterogeneous Internetworking", *IEEE INFOCOM'96*, 1996] the synchronous optical hypergraph idea was applied to networks with an arbitrary topology and with point-to-point links. The two papers [Li et al., "Pseudo-Isochronous Cell Switching In ATM Networks", *IEEE INFOCOM'94*, pages 428–437, 1994; Li et al., "Time-Driven Priority: Flow Control For Real-Time Heterogeneous Internetworking", *IEEE INFOCOM'96*, 1996] provide an abstract (high level)

description of what is called "RISC-like forwarding", in which a packet is forwarded, with little if any details, one hop every time frame in a manner similar to the execution of instructions in a Reduced Instruction Set Computer (RISC) machine.

SUMMARY OF THE INVENTION

In accordance with the present invention, a method is disclosed providing virtual pipes that carry real-time traffic over packet switching networks with widely varying link speeds, while guaranteeing end-to-end performance. The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: [Peter H. Dana, "Global Positioning System (GPS) Time Dissemination for Real-Time Applications", *Real-Time Systems,* 12, pp. 9–40, 1997]. By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http://www.boulder.nist.gov/timefreq) is responsible for coordinating UTC with the International Bureau of Weights and Measures (BIPM) in Paris.

UTC timing is readily available to individual PCs through GPS cards. For example, TrueTime, Inc.'s (Santa Rosa, Calif.) PCI-SG provides precise time, with zero latency, to computers that have PCI extension slots. Another way by which UTC can be provided over a network is by using the Network Time Protocol (NTP) [D. Mills, "Network Time Protocol" (version 3) *IETF RFC* 1305]. However, the clock accuracy of NTP is not adequate for inter-switch coordination, on which this invention is based.

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or an IP tag/label.

In accordance with the present invention, timing information is provided by using a Common Time Reference (CTR) signal, one such source is the above mentioned GPS. CTR is used for the timely forwarding over links with plurality of different time frame intervals: TF1, TF2, and so on. Employing different time frame intervals are useful in heterogeneous networks with widely varying link speeds, as shown in the following table. That is, the number of bytes that can be transmitted during one time frame of, say, 500/125/12.5 microseconds changes according to the link capacity.

| Link Capacity | Number of bytes per TFs - 125 microseconds | Number of bytes per TFs - 500 microseconds | Number of bytes per TFs - 12.5 microseconds |
|---|---|---|---|
| 10 Gb/s | 156,250 | 625,000 | 15,625 |
| 1 Gb/s | 15,625 | 62,500 | 1,562 |
| 155 Mb/s | 2,420 | 9,680 | 242 |
| 45 Mb/s | 703 | 2,812 | 70 + 0.3 |

In accordance with the present invention, the Internet "best effort" data packet forwarding strategy is integrated into the system. Furthermore, if the transmission of a "best effort" data packet does not complete at the end of a time frame, a real-time data packet can have a novel time-driven non-destructive preemptive priority. This implies that the transmission of a "best effort" data packet is stopped while real-time data packets are transmitted, and will resume after all scheduled real-time data packets have been transmitted. The time-driven preemption method used in this invention is novel since the preemption priority is given at a certain time, which is derived from the common time reference.

These and other aspects and attributes of the present invention will be discussed with reference to the following drawings and accompanying specification.

BRIEF DESCRIPTION OF THE DRAWINGS

FIG. 6A is an illustration of the structure of a data packet with header as used in the present invention;

FIG. 6B is an illustration in detail of specific fields in the header of FIG. 6A;

FIG. 17A details the protocol used to preempt data packets as used in the present invention;

FIG. 17B is a timing diagram illustrating an example preemption as provided by the present invention;

FIG. 17C is a timing diagram illustrating another example preemption as provided by the present invention;

FIG. 18A is an illustration of determination of the time-of-arrival of data packets in a first time base; and FIG. 18B is an illustration of determination of the time-of-arrival of data packets in a second time base.

DETAILED DESCRIPTION OF THE PREFERRED EMBODIMENT

Figure 1:
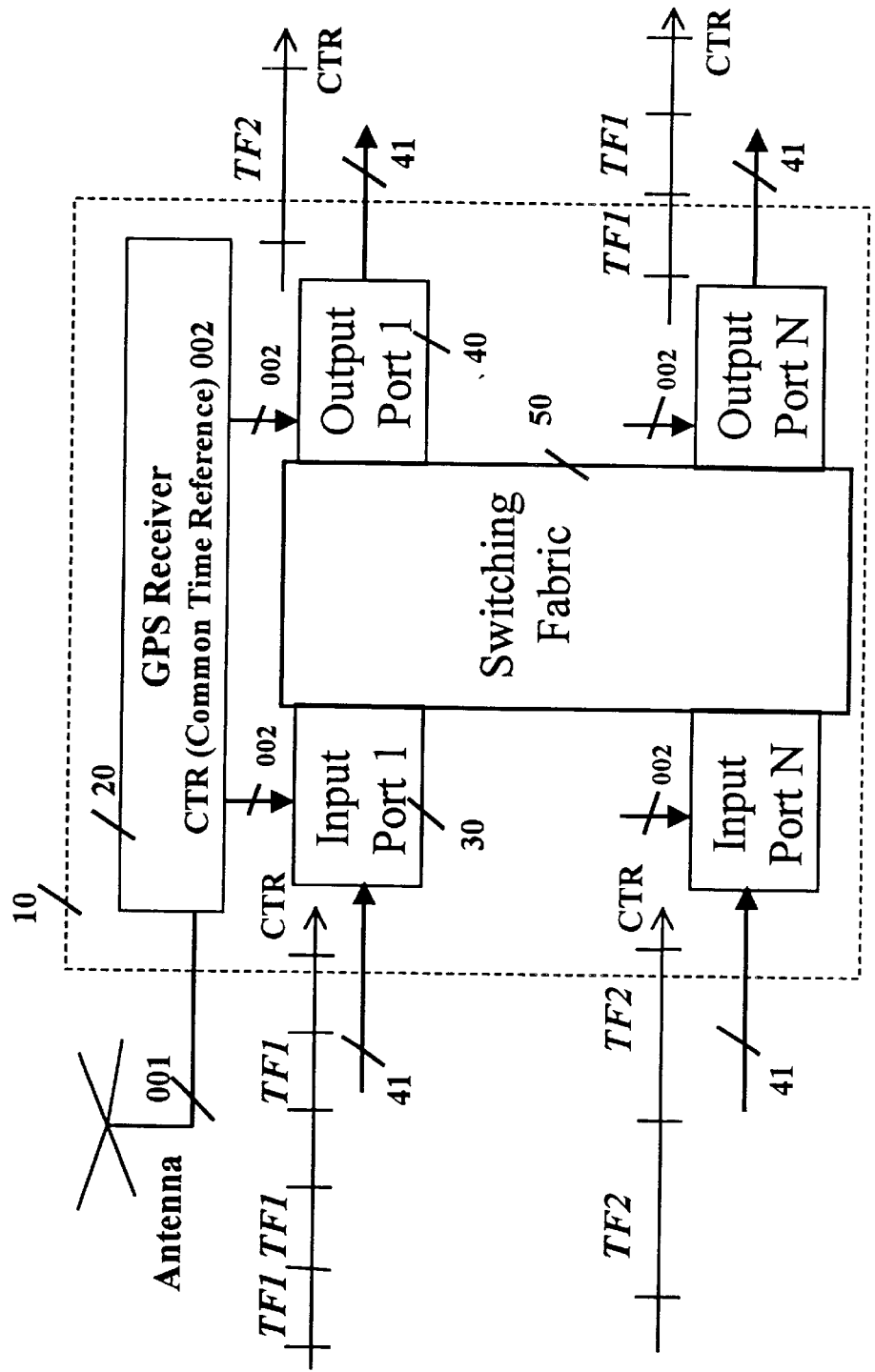
FIG. 1 is a schematic block diagram of the multiple time base synchronous virtual switch of the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated. The present invention relates to a system and method for transmitting and forwarding packets over a packet switching network. The switches of the network maintain a common time reference, which is obtained either from an external source (such as GPS—Global Positioning System) or is generated and distributed internally. The common time reference is used to define time intervals, which include time super-cycles, time cycles, time frames, time slots, and other kinds of time intervals. The time intervals are arranged both in simple periodicity and complex periodicity (like seconds and minutes of a clock).

A packet that arrives to an input port of a switch, is switched to an output port based on specific routing information in the packet's header (e.g., IPv4 destination address in the Internet, VCI/VPI labels in ATM). Each switch along a route from a source to a destination forwards packets in periodic time intervals that are predefined using the common time reference. Each link connecting switches along the route from source to destination may use identical time intervals. Alternatively, each link connecting switches along the route from source to destination may use different time intervals generated from or otherwise related to the common time reference.

A time interval duration can be longer than the time duration required for communicating a packet, in which case the exact position of a packet in the time interval is not predetermined. A packet is defined to be located within the time interval which contains the communication of the first bit of the packet, even if the length of the packet is sufficiently long to require multiple time intervals to communicate the entire packet.

Packets that are forwarded inside the network over the same route and in the same periodic time intervals constitute a virtual pipe and share the same pipe-ID. A pipe-ID can be either explicit, such as a tag or a label that is generated inside the network, or implicit such as a group of IP addresses. A virtual pipe can be used to transport data packets from multiple sources and to multiple destinations. The time interval in which a switch forwards a specific packet is determined by the packet's pipe-ID, the time it reaches the switch, and the current value of the common time reference.

A virtual pipe provides deterministic quality of service guarantees to the packets that are travelling through it. In accordance with the present invention, congestion-free packet switching is provided for pipe-IDs in which capacity in their corresponding forwarding links and time intervals is reserved in advance. Furthermore, packets that are transferred over a virtual pipe reach their destination in predefined time intervals, which guarantees that the delay jitter or delay uncertainty is smaller than or equal to one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a scheduling controller maps selected predefined time frames for transfer into and out from each of the respective switches responsive to the common time reference signal. Each communications link may use a different time frame duration generated from the common time reference signal.

Different time frame durations can be required when utilizing communications links of differing bandwidth or capacity. For example, common communications links today include slow links, such as DS1 or T1 that are inherently limited to about 1.5 Mbit/s of bandwidth, and faster links, such as an OC-3 channel that has 155 Mbit/s of bandwidth. A time frame suitable for a T1 link may prove to be interminably long for an OC-3 link. Similarly, a time frame duration suitable for an OC-3 link may be too short to be useful on a T1 link. Similar circumstances arise with any two or more communications links of different capacity (e.g., DS0, T1, T3, OC-3, OC-12, and OC-48).

In general, a slower link speed suggests a longer time frame duration, and a faster link speed suggests a shorter time frame duration, but the time frame duration does not need to be adjusted to meet these suggestions. Any number of links having different capacities may share the same time frame duration. Conversely, different time frame durations could be selected for various ones of a plurality of links all having the same identical bandwidth. The present invention is directed to the case where the time frame durations are different on at least two of the communications links, irrespective of the capacity or available bandwidth of those links.

For each switch, there is a first predefined time frame within which a respective data packet is transferred into the respective switch, and a second predefined time frame within which the respective data packet is forwarded out of the respective switch, wherein the first and second predefined time frames may have different durations. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

In some configurations of this invention there is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

In some other configurations of this invention a virtual pipe can be constructed of communication links each with different time frame and/or time cycle duration. Furthermore, a communication link can be used by plurality of pipes each with different time frame duration and/or different time cycle duration.

The time frames associated with a particular one of the switches within the virtual pipe are associated with the same switch for all the time cycles, and are also associated with one of input into or output to or from the particular respective switch. Note that each input or output port can be associated with different time frame duration and/or different time cycle interval.

In a more general construction of the present invention, a time cycle can be constructed of a reoccurring sequence of time frames, where each time frame can have different time duration. In this case, the time frame duration depends on the time frame position within the time cycle. This implies that two consecutive time frames within the same time cycle can have different time frame durations.

In some configurations of this invention there is a constant fixed time between the input into and output from a respective one of the switches. This fixed time can measured by using either the time frame duration on the input link or the time frame duration on the output link. Furthermore, this fixed time is reoccurring within each of the time cycles. A fixed number of contiguous time cycles comprise a super cycle, which is periodic. Data packets that are forwarded over a given communications link are forwarded from an output port within a predefined subset of time frames in each super cycle. Furthermore, the number of data packets that can be forwarded in each of the predefined subset of time frames within a super cycle for a given communications link is also predefined.

In the preferred embodiment the common time reference signal is coupled from a GPS (Global Positioning System), and is in accordance with the UTC (Coordinated Universal Time) standard. The UTC time signal does not have to be received directly from GPS. Such signal can be received by a switch by using various means, as long as the delay or time uncertainty associated with that UTC time signal does not exceed half of the shortest time frame duration that is associated with that switch.

In one embodiment, the super cycle duration is equal to one second as measured using the UTC (Coordinated Universal Time) standard. In an alternate embodiment the super cycle duration spans multiple UTC seconds. In another alternate embodiment the super cycle duration is a fraction of a UTC second. In the most preferred embodiment, the super-cycle duration is a small integer number of UTC seconds.

A select buffer and time-driven preemption controller maps one of the time frames for output from a first switch to a second time frame for input via the communications link to a second switch, while the first and second time frames can have different durations. The select buffer and time-driven preemption controller uses the UTC time signal in order to identify the boundaries between two successive time frames. The select buffer and time-driven preemption controller inserts a time frame delimiter (TFD) signal into the transmission link in order to the signal the second switch with the exact boundary between two time frames.

Each of the data packets is encoded as a stream of data, and a time frame delimiter is inserted into the stream of data responsive to the select buffer and time-driven preemption controller. This can be implemented by using a redundant serial codewords as it is later explained.

The communication links can be of fiber optic, copper, and wireless communication links for example, between a ground station and a satellite, and between two satellites orbiting the earth. The communication link between two nodes does not have to be a serial communication link. A parallel communication link can be used—such link can simultaneously carry multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI/VPI).

The routing controller determines three possible associations of an incoming data packet: (1) the output port, (2) the link type, characterized by the time frame, time cycle and super cycle durations that are associated with it, and (3) the time of arrival (ToA). The ToA is then used by the scheduling controller for determining when a data packet should be forwarded by the select buffer and time-driven preemption controller to the next switch in the virtual pipe. The routing controller utilizes at least one of Internet protocol version 4 (IPv4), Internet protocol version 6 (IPv6) addresses, Internet protocol group multicast address, Internet MPLS (multi protocol label swapping or tag switching)

labels, ATM virtual circuit identifier and virtual path identifier (VCI/VPI), and IEEE 802 MAC (media access control) addresses, for mapping from an input port to an output port.

Each of the data packets is comprised of a header, which includes an associated time stamp. For each of the mappings by the routing controller, there is an associated mapping by the scheduling controller, of each of the data packets between the respective associated time-stamp and an associated forwarding time out, which is associated with one of the predefined time frames. The time stamp can record the time in which a packet was created by its application.

In one embodiment the time stamp is generated by an Internet real-time protocol (RTP), and by a predefined one of the sources or switches. The time stamp can be used by a scheduling controller in order to determine the forwarding time of a data packet from an output port.

Each of the data packets originates from an end station, and the time stamp is generated at the respective end station for inclusion in the respective originated data packet. Such generation of a time stamp can be derived from UTC either by receiving it directly from GPS or by using the Internet's Network Time Protocol (NTP). Alternatively, the time stamp can be generated at a sub-network boundary or at the boundary of the synchronous virtual pipe.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

Figure 3:
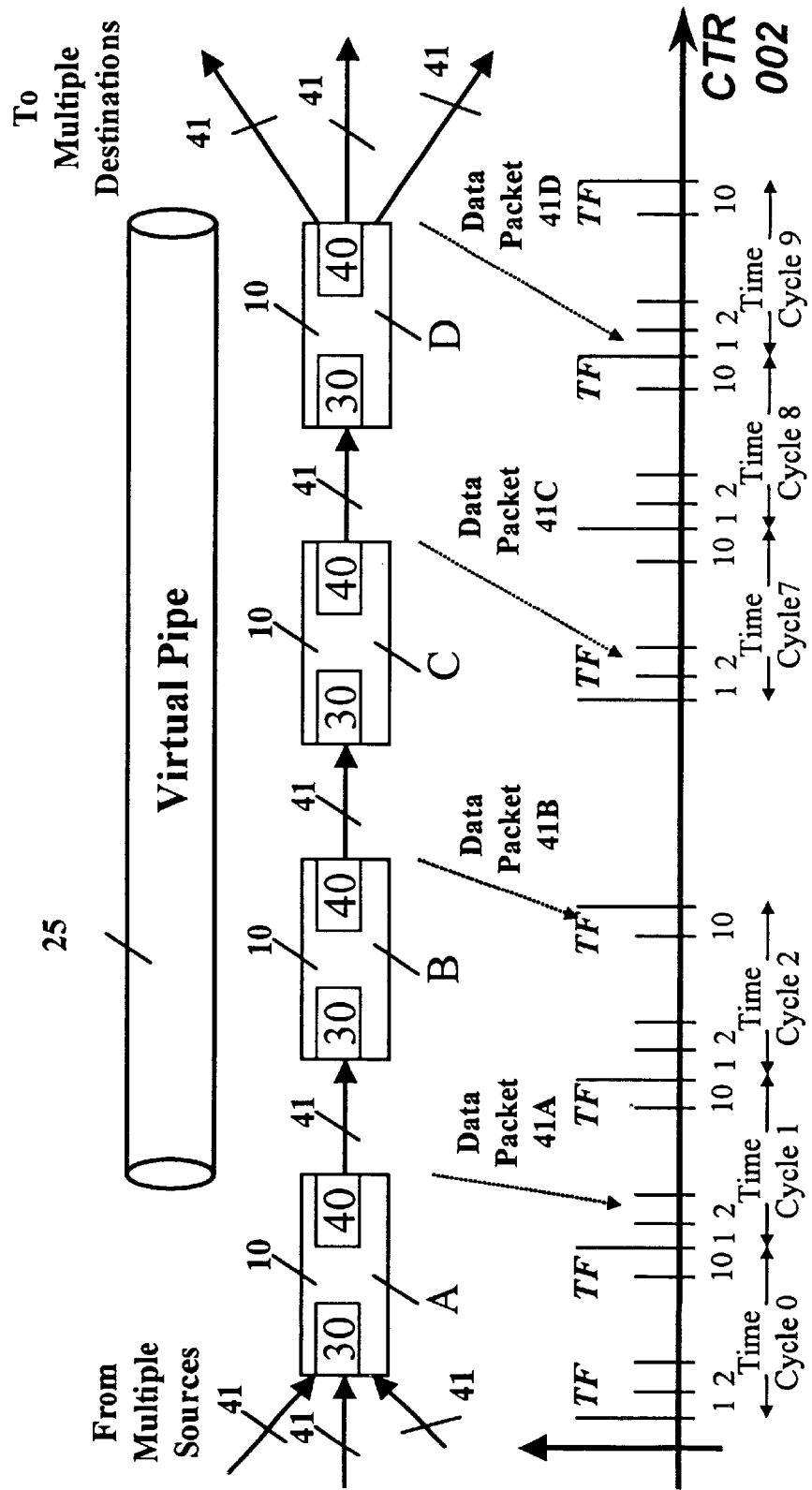
FIG. 3 is a schematic block diagram of a synchronous virtual pipe as used in the present invention.

In accordance with the design, method, and illustrated implementation of the present invention, one or a plurality of virtual pipes 25 are provided, as shown in FIG. 3, over a data network with general topology. Such data network can span the globe. Each virtual pipe 25 is constructed over one or more switches 10 shown in FIG. 3, which are interconnected via communication links 41 in a path.

FIG. 3 illustrates a virtual pipe 25 from switch A, through switches B and C, and ending at switch D. The virtual pipe 25 transfers data packets from at least one source to at least one destination. As shown, switch A may accept data from a plurality of sources via communications links 41. Also as shown, switch D may output data to a plurality of destinations via communications links 41.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference signal (not shown) to each of the switches 10.

FIG. 1 is a schematic block diagram of the multiple frame duration synchronous virtual pipe (SVP) switch 10 of the present invention. The SVP switch 10 comprises a common time reference means 20, at least one input port 30, at least one output port 40, and a switching fabric 50. In the preferred embodiment, the common time reference means 20 is a GPS receiver that receives a source of common time reference 001 (e.g., UTC via GPS) via an antenna as illustrated. The common time reference means 20 provides a common time reference signal 002 to all input ports 30 and all output ports 40. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

Each respective one of the input ports 30 is coupled to the switching fabric 50. Each respective one of the output ports 40 is coupled to the switching fabric 50.

The SVP switch 10 of FIG. 1 is also coupled to one or more communications links 41 by way of input and output ports 30 and 40, respectively. The communications links 41 can be implemented within an IP network.

In the present invention, the communications links 41 need not share the same time frame duration. Each of the communications links 41 may have a time frame of a different duration. As illustrated in FIG. 1, some of the communications links have a time frame duration of TF1, and some others of the communications links have a time frame duration of TF2. The present invention is not limited to two different time frame durations. Any number of different time frame durations may be accommodated by the multiple frame duration SVP switch of the present invention.

Figure 2:
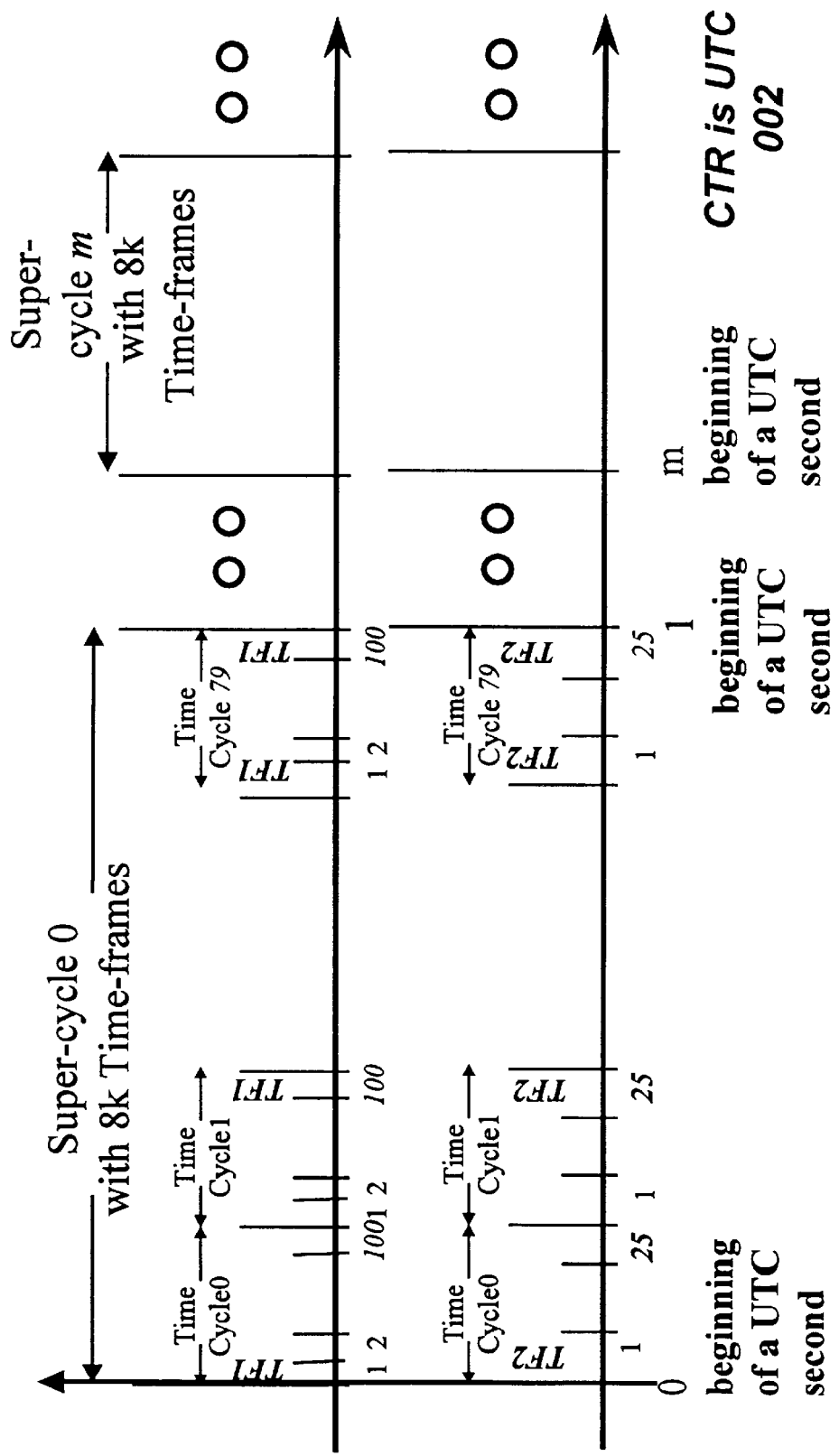
FIG. 2 is a timing diagram relating the common time reference (CTR) that is aligned to UTC and super-cycles, time cycles, and multiple sizes of time frames as used in the present invention.

FIG. 2 is a timing diagram relating the common time reference (CTR) that is aligned to UTC and super-cycles, time cycles, and multiple sizes of time frames as used in the present invention. The top horizontal axis details the timing of a communications link employing a first time frame duration. The bottom horizontal axis details the timing of a communications link employing a second time frame duration. Both axes are plotted with respect to the same common time reference.

As shown in FIG. 2, the communications link employing the first time frame duration comprises 80 time cycles within each super-cycle, with the time cycles numbered 0 through 79. Within each of the time cycles are 100 time frames of duration TF1, numbered 1 through 100. The duration of the time frame TF1 is selected to be 125 microseconds, thus determining a time cycle to be 12.5 milliseconds and a super-cycle of exactly one UTC second.

As shown in FIG. 2, the communications link employing the second time frame duration comprises 80 time cycles within each super-cycle, with the time cycles numbered 0 through 79. Within each of the time cycles are 25 time frames of duration TF2, numbered from 1 through 25. The duration of the time frame TF2 is selected to be 500 microseconds, thus determining a time cycle to be 12.5 milliseconds and a super-cycle of exactly one UTC second.

For scheduling of data transfer between two communications links, it is obviously most convenient if they share the same time frame duration. If they have different time frame durations, it is convenient to pick those durations and numbers of time frames per time cycle so that they share the same time cycle duration and super-cycle duration (as in the example shown in FIG. 2). If two communications links have different time frame durations and different time cycle durations, the respective durations and numbers of time frames and time cycles within a super-cycle should be selected to permit both communications links to share the same overall super-cycle duration.

FIG. 2 also illustrates how the common time reference signal can be aligned with the UTC (Coordinated Universal Time) standard. In this illustrated example, the duration of every super-cycle is exactly one second as measured by the UTC standard. Moreover, as shown in FIG. 2 the beginning of each super-cycle coincides with the beginning of a UTC second. Consequently, when leap seconds are inserted or deleted for UTC corrections (due to changes in the earth rotation period) the cycle and super-cycle periodic scheduling will not be affected. The time frames, time cycles, and super-cycles are associated in the same manner with all respective switches within the virtual pipe at all times.

In the embodiment illustrated in FIG. 2, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In the most preferred embodiment, the super-cycle duration is a small integer number of UTC seconds.

Pipeline forwarding relates to data packets being forwarded across a virtual pipe with a predefined delay in every stage (either across a communication link 41 or across a switch 10 from input port 30 to output port 40). Data packets enter a virtual pipe 25 from one or more sources and are forwarded to one or more destinations.

Referring to FIG. 3, the timely pipeline forwarding of data packets over the virtual pipe 25 is illustrated. In this example, time cycles each uniformly contain 10 time frames, and for clarity the super-cycles are not shown. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 3,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multi-cast (one-to-many) data packet forwarding).

The communication link 41 between two adjacent ones of the switches 10 can be used simultaneously by at least two of the virtual pipes.

A plurality of virtual pipes can multiplex (i.e., mix their traffic) over the same communication links.

A plurality of virtual pipes can multiplex (i.e., mix their traffic) during the same time frames and in an arbitrary manner.

The same time frame can be used by multiple data packets from one or more virtual pipes.

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super-cycles.

The switch 10 structure, as shown in FIG. 1, can also be referred to as a pipeline switch, since it enables a network comprised of such switches to operate as a large distributed pipeline structure, as it is commonly found inside digital systems and computer architectures.

Figure 4:
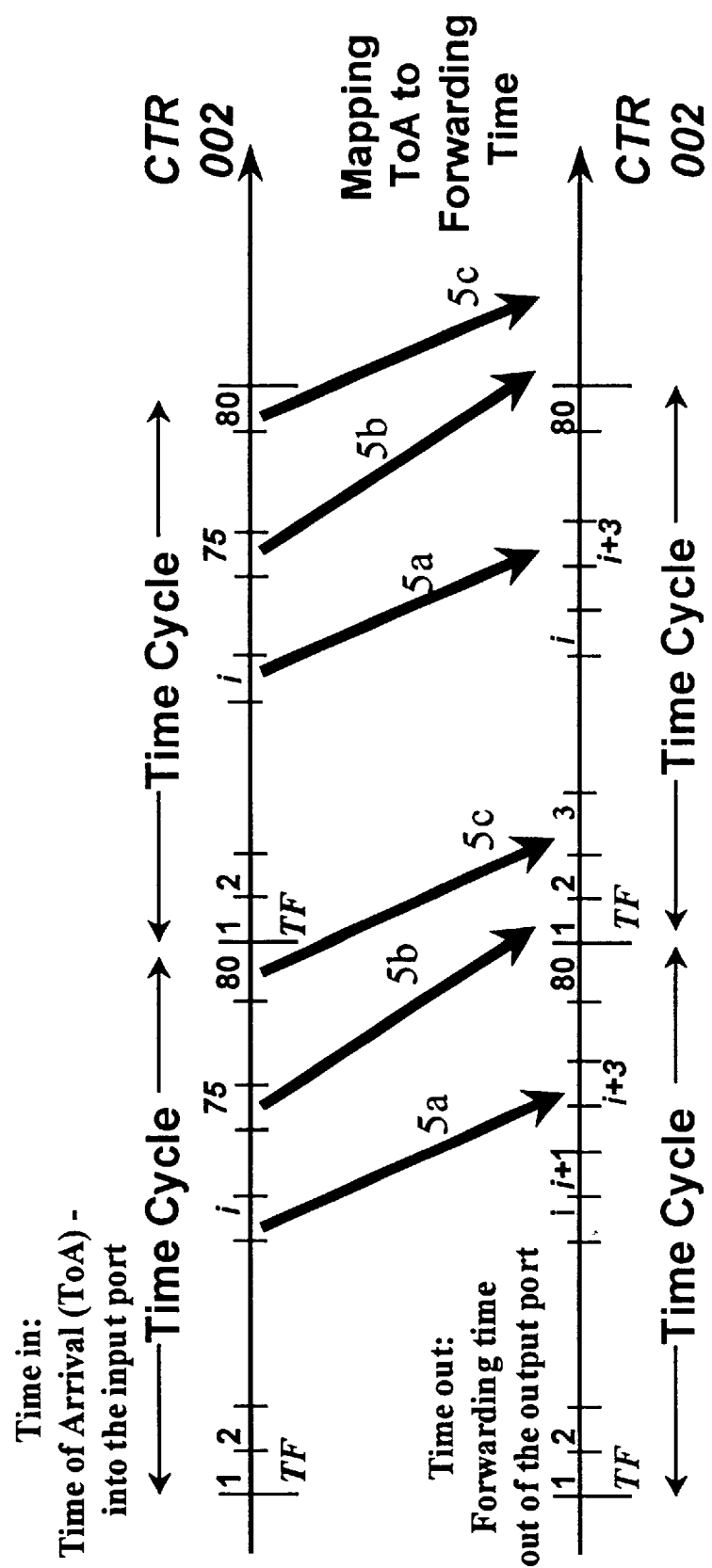
FIG. 4 is a timing diagram illustrating periodic scheduling and forwarding as used in the present invention.

FIG. 4 illustrates the mapping of the time frames into and out of a node on a virtual pipe, wherein the mapping repeats itself in every time cycle illustrating the time in, which is the time of arrival (ToA), versus the time out, which is the forwarding time out of the output port. FIG. 4 thereby illustrates the periodic scheduling and forwarding timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch.

In the illustrated example of FIG. 4, a first data packet 5a arriving at the input port of the switch at time frame i is forwarded out of the output port of the switch at time frame i+3. In this example the data packet is forwarded out of the output port at a later time frame within the same time cycle in which it arrived. The delay in transiting the switch, dts, determines a lower bound on the value (i+dts). In the illustrated example, dts must be less than or equal to 3.

Also as shown in FIG. 4, a second data packet 5b arriving at the input port of the switch at time frame 75 is forwarded out of the output port of the switch at time frame 1 within the next time cycle. In this example the data packet is forwarded out of the output port at a earlier numbered time frame but within the next time cycle from which it arrived. Note that data packets in transit may cross time cycle boundaries.

If—for example—each of the three data packets has 125 bytes (i.e. 1000 bits), and there are 80 time frames of 125 microseconds in each time cycle (i.e. a time cycle duration of 10 milliseconds), then the bandwidth allocated to this virtual pipe is 300,000 bits per second. In general, the bandwidth or capacity allocated for a virtual pipe is computed by dividing the number of bits transferred during each of the time cycles by the time cycle duration. In the case of a bandwidth in a super-cycle, the bandwidth allocated to a virtual pipe is computed by dividing the number of bits transferred during each of the super-cycles by the super-cycle duration.

Figure 7:
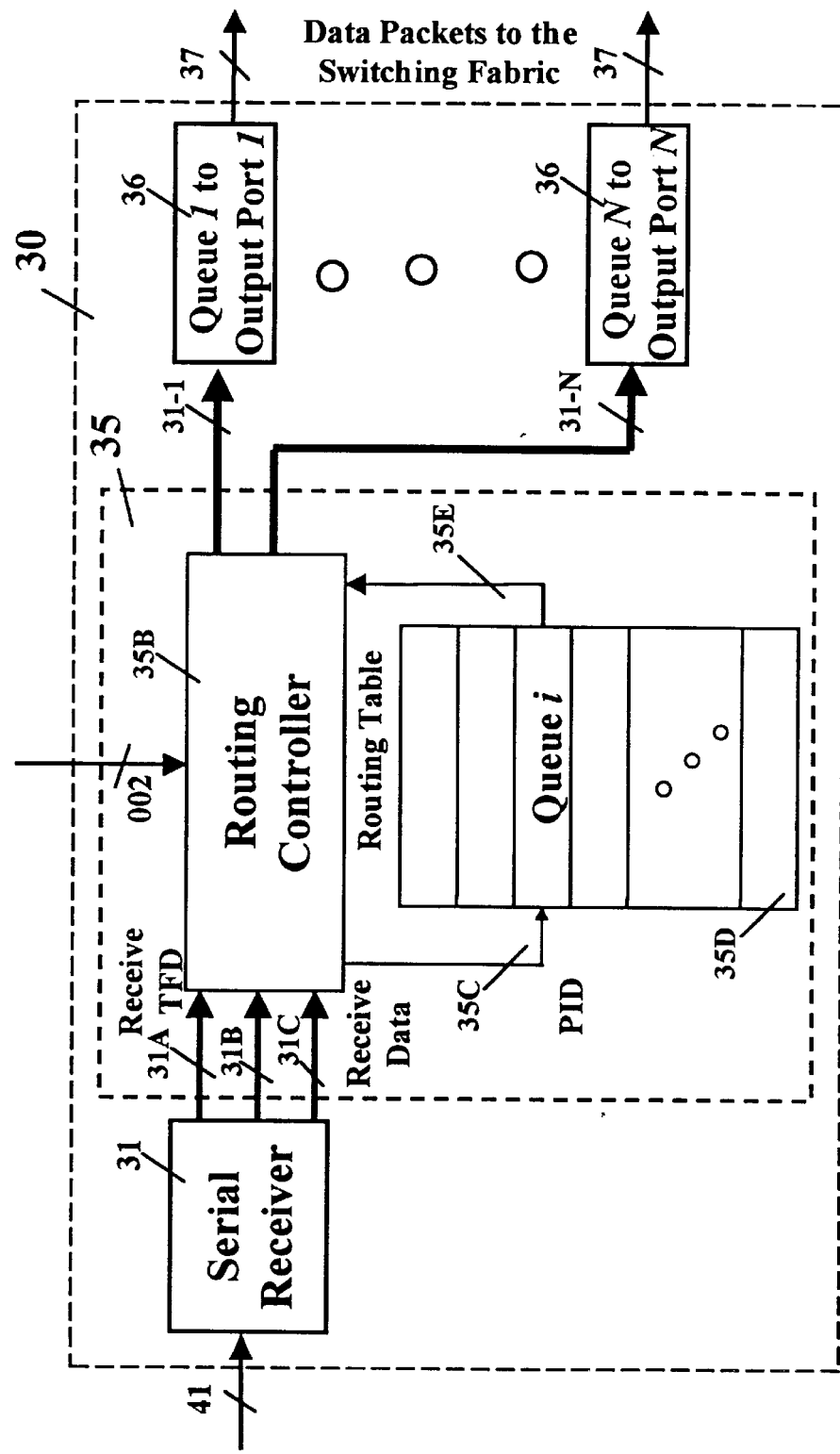
FIG. 7 is a schematic block diagram of an input port of the multiple time base synchronous virtual switch of the present invention.
Figure 9:
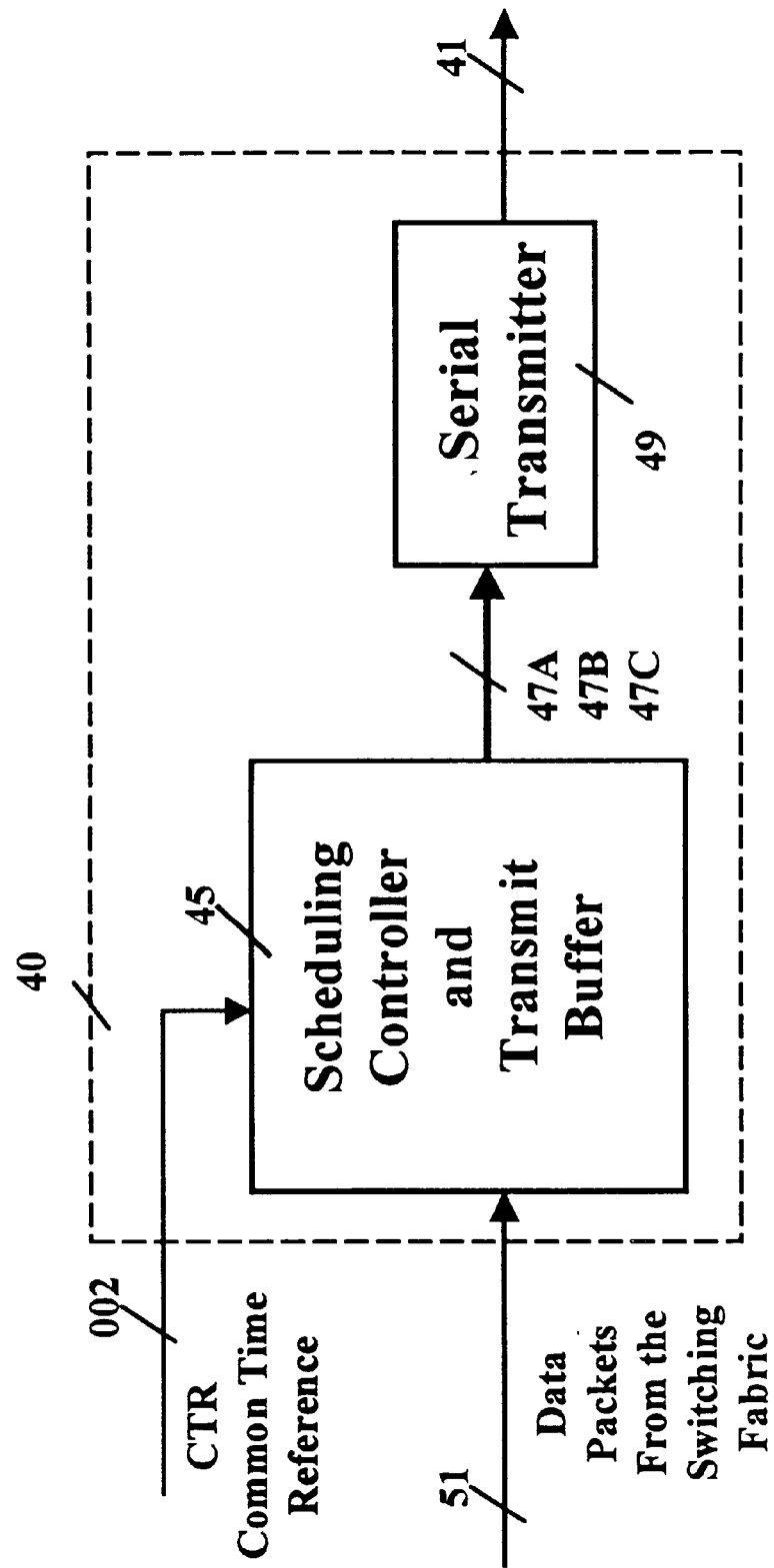
FIG. 9 is a schematic block diagram of an output port of the multiple time base synchronous virtual pipe switch of the present invention.

Each switch 10 is comprised of a plurality of addressable input ports 30 and output ports 40. As illustrated in FIG. 7, the input port 30 is further comprised of a routing controller 35B for mapping each of the data packets that arrives at each one of the input ports to a respective one of the queue to the output ports. As illustrated in FIG. 9, the output port 40 is further comprised of a scheduling controller and transmit buffer 45.

Figures 5A, 5B, 5C:
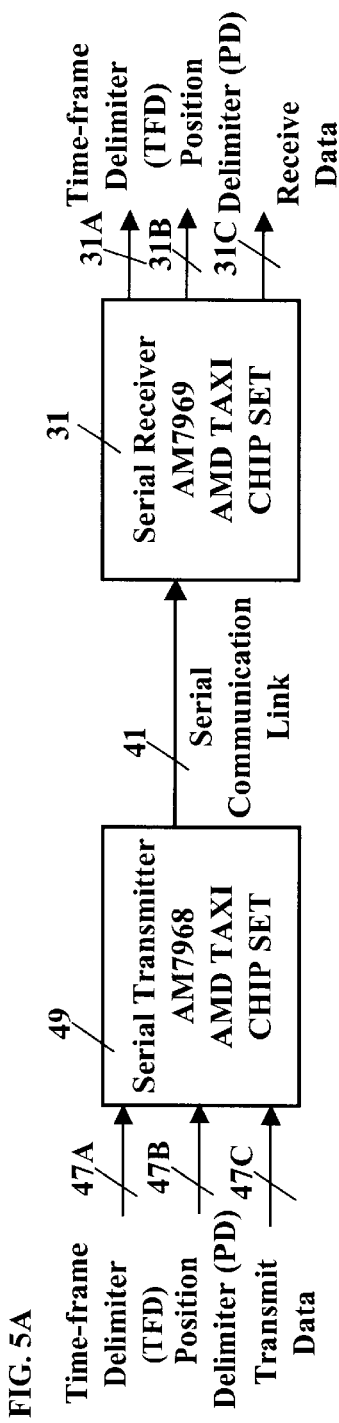
FIG. 5A is a schematic block diagram of the link layer of a synchronous virtual pipe of the present invention.
FIG. 5B is a data word encoding table of the present invention.
FIG. 5C is a control word encoding table of the present invention.

An output port 40 is connected to a next input port 30 via a communication link 41, as shown in FIGS. 3 and 5A. The communication link can be realized using various technologies compatible with the present invention including fiber optic conduits, copper and other wired conductors, and wireless communication links—including but not limited to, for example, radio frequency (RF) between two ground stations, a ground station and a satellite, and between two satellites orbiting the earth, microwave links, infrared (IR) links, optical communications lasers. The communication link does not have to be a serial communication link. A parallel communication link can be used—such a parallel link can simultaneously carry multiple data bits, associated clock signals, and associated control signals.

As shown in FIG. 1, the common time reference 002 is provided to the input ports 30 and output ports 40 (comprising the input/output ports 30/40) from the GPS time receiver 20, which receives its timing signal from the GPS antenna 001. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

FIG. 5A is an illustration of a serial transmitter and a serial receiver. FIG. 5B is a table illustrating the 4B/5B encoding scheme for data, and FIG. 5C is a table illustrating the 4B/5B encoding scheme for control signals.

Referring to FIG. 5A, a serial transmitter 49 and serial receiver 31 are illustrated as coupled to each link 41. A variety of encoding schemes can be used for a serial line link 41 in the context of this invention, such as, SONET/SDH, 8B/10B Fiber Channel, and 4B/5B Fiber Distributed Data Interface (FDDI). In addition to the encoding and decoding of the data transmitted over the serial link, the serial transmitter/receiver (49 and 31) sends/receives control words for a variety of in-band control purposes, mostly unrelated to the present invention description.

However, one control word, time frame delimiter (TFD), is used in accordance with the present invention. The TFD marks the boundary between two successive time frames and is sent by a serial transmitter 49 when a CTR 002 clock tick occurs in a way that is described hereafter as part of the output port operation.

It is necessary to distinguish in an unambiguous manner between the data words, which carry the information, and the control signal or words (e.g., the TFD is a control signal) over the serial link 41. There are many ways to do this. One way is to use the known 4B/5B encoding scheme (used in FDDI). In this scheme, every 8-bit character is divided into two 4-bit parts and then each part is encoded into a 5-bit codeword that is transmitted over the serial link 41.

In a preferred embodiment the serial transmitter 49 and receiver 31 comprise AM7968 and AM7969 chip sets, respectively, both manufactured by AND Corporation.

FIG. 5B illustrates an encoding table from 4-bit data to 5-bit serial codeword. The 4B/5B is a redundant encoding scheme, which means that there are more codeword than data words. Consequently, some of the unused or redundant serial codeword can be used to convey control information.

FIG. 5C is a table with 15 possible encoded control codeword, which can be used for transferring the time frame delimiter (TFD) over a serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codeword, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

FIG. 7 is a schematic block diagram of an input port with a routing controller. As shown in FIG. 7, the input port 30 has several parts including: serial receiver 31, a routing controller 35 and separate queues to the output ports 36. The serial receiver 31 transfers the incoming data packets and the time frame delimiters to the routing controller 35.

The controller 35 comprises a routing controller 35B that is constructed of a central processing unit (CPU), a random access memory (RAM) for storing the data packet, read only memory (ROM) for storing the routing-controller processing program; and a routing table 35D that is used for determining the output port that the incoming data packet should be switched to.

FIG. 6A is an illustration of a data packet structure with a header that includes a time stamp, two priority bits, a multi-cast bit, and an attached time of arrival (ToA), port number, and link type. FIG. 6B is additional detail about the encoding of the priority and multi-cast bits of FIG. 6A.

As shown in FIG. 6A, the incoming data packet consists of a header and a payload portion. The header includes, as shown in FIGS. 6A and 6B, a time stamp value 35TS, a multi-cast indication 35M, a priority indication 35P, and a virtual PID indication 35C. The priority indication 35P may include encoding of a high and a low priority. In an alternate embodiment, multiple levels of priority are encoded by priority indication 35P. In a preferred embodiment the multiple levels of priority include Constant Bit Rate (CBR) priority, Variable Bit Rate (VBR) priority, Best Effort (BE) priority, and Rescheduled priority. The multi-cast indication 35M may include encoding indicating one destination or a plurality of destinations. In the case of a plurality of destinations there can be one or more PIDs.

Referring back to FIG. 7, the incoming data packet header includes a virtual pipe identification, PID 35C, that is used to lookup in the routing table 35D the address 35E of the queue 36 that the incoming data packet should be transferred into.

Before the incoming data packet is transferred into its queue 36, the time of arrival (ToA) information 35T is attached to the data packet header as illustrated in FIGS. 6A and 6B. The ToA information is the value of the common time reference (CTR) signal 002 at the time the incoming data packet arrived at the input port. In the preferred embodiment, the ToA 35T may additionally comprise a port number and a link type indication. A link type indication may indicate the base speed of the link (e.g., DS0, T1, T3, OC-3, OC-12, and OC48), and/or it may indicate timing information for the link including time frame duration, time frames per time cycle, time cycle duration, and time cycles per super-cycle. In general, a slower link speed suggests a longer time frame duration, and a faster link speed suggests a shorter time frame duration, but the time frame duration does not need to be adjusted to meet these suggestions.

The link type as part of the ToA 35T information provides the routing controller 35B with the information necessary to properly route the data packets received on that communications link to the switch fabric 50. The ToA 35T is also used by the scheduling controller 45 of the output port 40 in the computation of the forwarding time out of the output port, and shown in FIG. 9. Note that the ToA 35T value that is appended to the incoming data packet is distinct and separate from the time stamp value 35TS that is included as part of the incoming data packet header. After the incoming data packet has the ToA information appended to it, it is routed by the routing controller 35B via respective buses (31-1, 31-N) to the respective appropriate queue 36.

The ToA 35T and time stamp 35TS can have a plurality of numerical formats. For example, the format of the Network Time Protocol [D. Mills, *Network Time Protocol* (version 3) IETF RFC 1305] is in seconds relative to 0 h UTC on Jan. 1, 1900. The full resolution NTP timestamp is a 64-bit unsigned fixed point number with the integer part in the first 32 bits and the fractional part in the last 32 bits. In some fields where a more compact representation is appropriate, only the middle 32 bits are used; that is, the low 16 bits of the integer part and the high 16 bits of the fractional part. The high 16 bits of the integer part must be determined independently.

The incoming data packet can have various formats, such as but not limited to Internet protocol version 4 (IPv4), Internet protocol version 6 (IPv6), and asynchronous transfer mode (ATM) cells. The data packet's PID 35C can be determined by but is not limited to one of the following: an Internet protocol (IP) address, an asynchronous transfer mode (ATM) a virtual circuit identifier, a virtual path identifier (VCI/VPI), Internet protocol version 6 (IPv6) addresses, Internet Multi Protocol Label Swapping (MPLS) or tag switching labels, and an IEEE 802 MAC (media access control) address.

Figure 8:
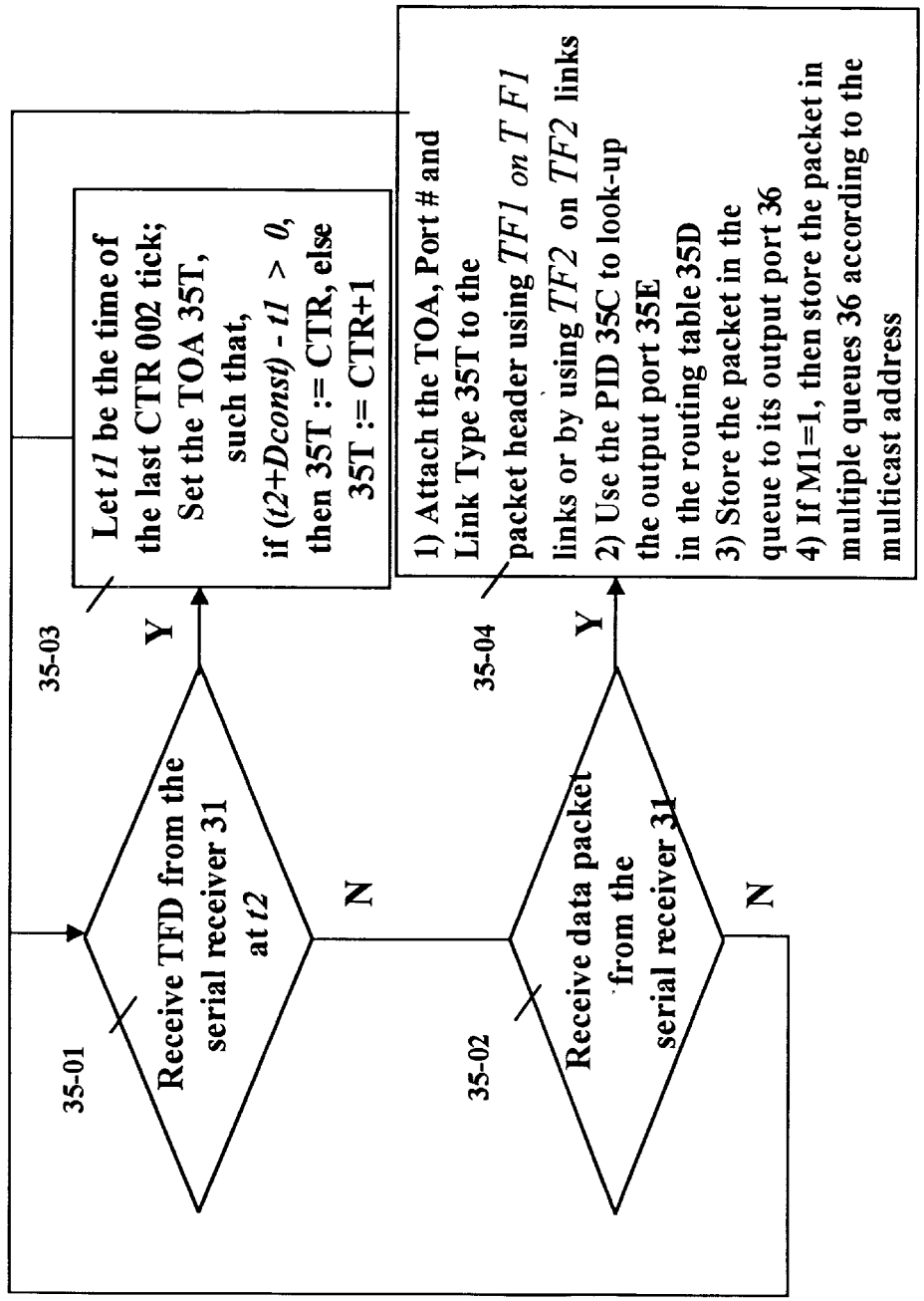
FIG. 8 is a flow diagram illustrating the operation of the routing controller of the present invention.

FIG. 8 illustrates the flow chart for the processing program executed by the routing controller 35B. The program is responsive to two basic events from the serial receiver 31 of FIG. 7: the received time frame delimiter TFD at step 35-01, and the receive data packet at step 35-02. After receiving a TFD, the routing controller 35 computes the time of arrival (ToA) 35T value at step 35-03 that is to be attached or appended to the incoming data packets.

For the computation of the ToA information 35T the routing controller uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames.

When the data packet is received at step 35-02, the routing controller 35B executes the four operations as set forth in step 35-04: attach the ToA information, lookup the address of the queue 36 using the PID, storing the data packet in that queue 36, and decode and process multi-cast indication 35M.

The first operation of step 35-04 attaches or appends the ToA information computed in step 35-03 to the incoming data packet. The ToA information 35T also includes link type and port information, as discussed above. Identifying the link type and port information permits the routing controller 35B to correctly route data packets arriving within time frames of differing durations.

The second operation in step 35-04 uses the PID 35C to reference lookup table 35D to determine the address of the output port 35E of the selected output port queue. The third operation of step 35-04 copies, forwards, or transfers the incoming data packet to the queue 36 responsive to the address 35E.

The fourth operation of 35-04 (decode and process multi-cast indication) may also comprise the method of copying the incoming data packet with appended or attached ToA information into a plurality of the queues 36 to effect a simultaneous multi-cast forwarding operation where the incoming data packet is simultaneously forwarded to more than one output port queue.

There are various ways to implement the switching fabric 50. However, the switching fabric is peripheral to the present invention, and so it will be described only briefly. The main property that the switching fabric should ensure is that data packets for which the priority indicator (35P in FIGS. 6A and 6B) is set to high, CBR, or VBR, then priority (i.e. reserved traffic) will be switched into the output port in a constant bounded delay, measured in time frames of the destination.

This is possible in accordance with the present invention, where the data packets in the input ports are already separated into queues to their respective output ports. Then, by using the Clos theorem in the time domain (see *Switching and Traffic Theory for Integrated Broadband Networks*, J. Y. Hui, page 65), the delay can be bounded by a duration equal to two destination time frames, wherein one time destination frame duration is consumed at the input port and one destination time frame duration is consumed to get across the switching fabric. Other implementations can be used, such as based on shared bus with round robin service of the high priority data packets, or a crossbar switch fabric.

Another possible switch design is shared memory, which ensures a deterministic delay bound from an input port to an output port. Shared memory data packet switches are commercially available from various vendors, for example, MMC Networks Inc. (Santa Clara, Calif.).

The output port 40 is illustrated in FIG. 9, comprised of a scheduling controller with a transmit buffer 45, and serial transmitter 49 as previously described herein. The scheduling controller 45 performs a mapping of each of the data packets between the associated respective time of arrival (ToA) and an associated forwarding time out of the output port via the serial transmitter 49. The forwarding time is determined relative to the common time reference (CTR) 002. Data packets arrive from the switching fabric via coupling 51 to the scheduling controller and transmit buffer 45. Scheduled data packets are forwarded out of the scheduling controller and transmit buffer 45 during scheduled destination time frame durations via couplings 47A, 47C to the serial transmitted 49. The serial transmitter 49 forwards outgoing data packets via communications link 41.

Figure 10:
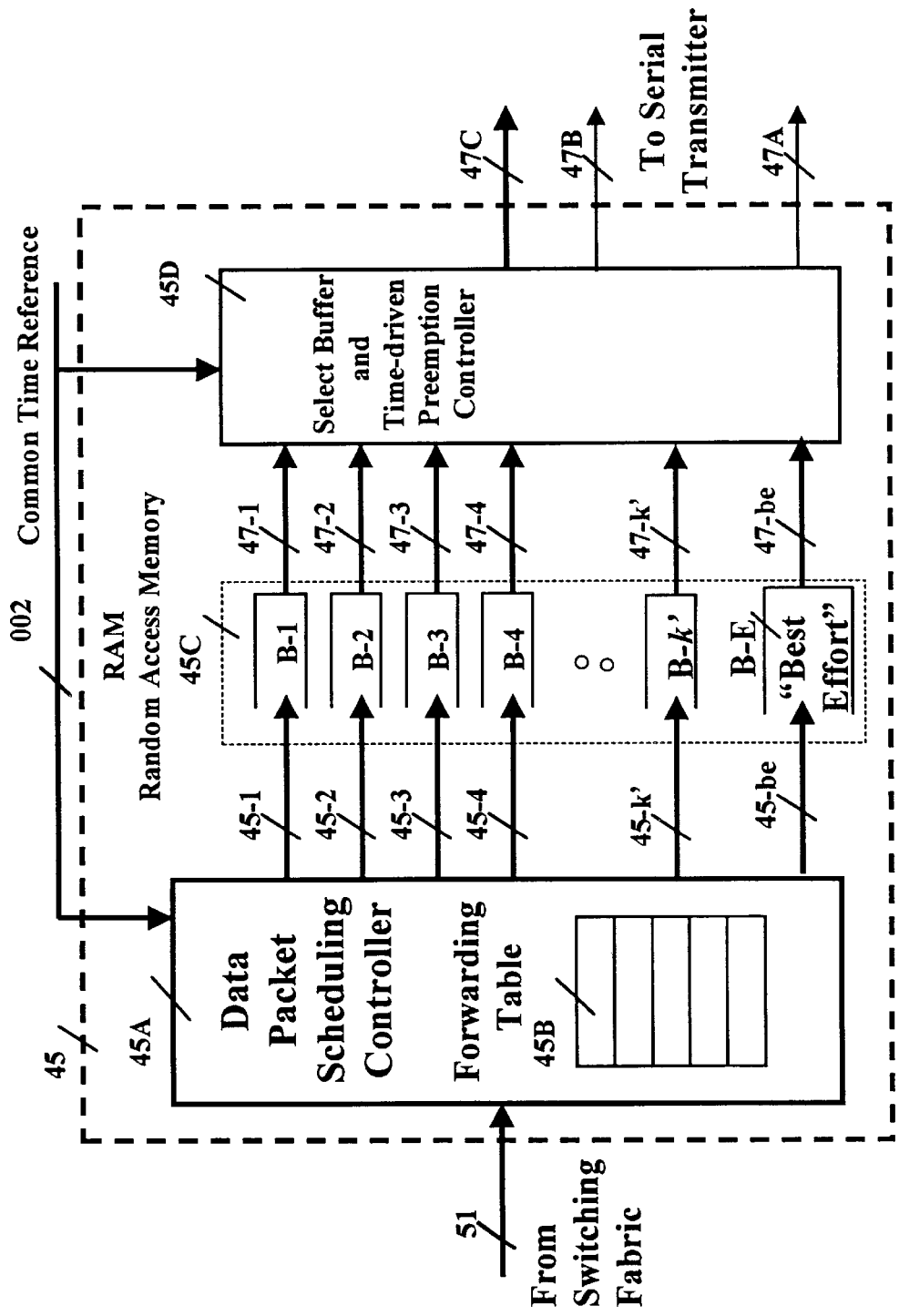
FIG. 10 is a schematic block diagram of the scheduling controller and transmit buffer of the present invention.
Figure 11:
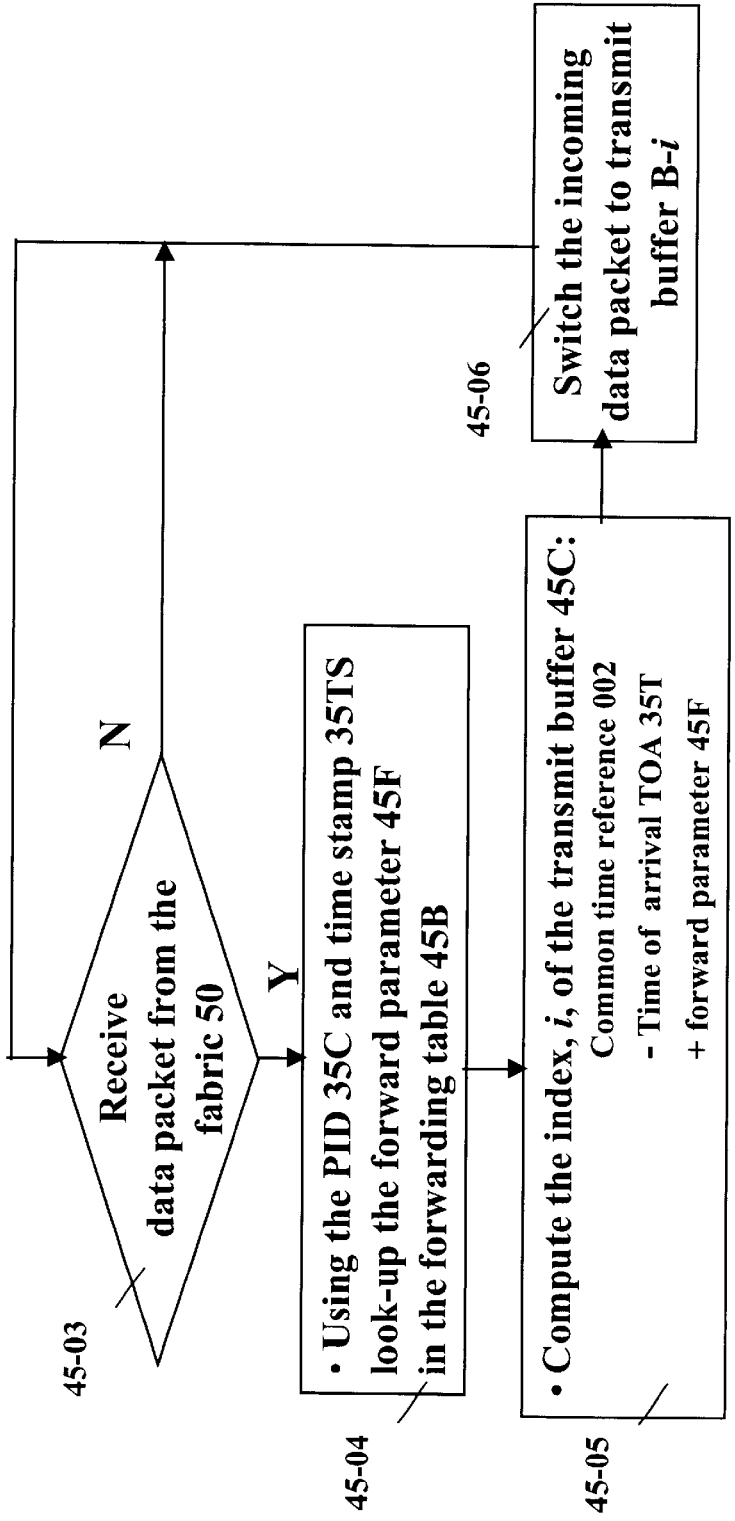
FIG. 11 is a flow diagram illustrating the operation of the scheduling controller of the present invention.
Figure 12:
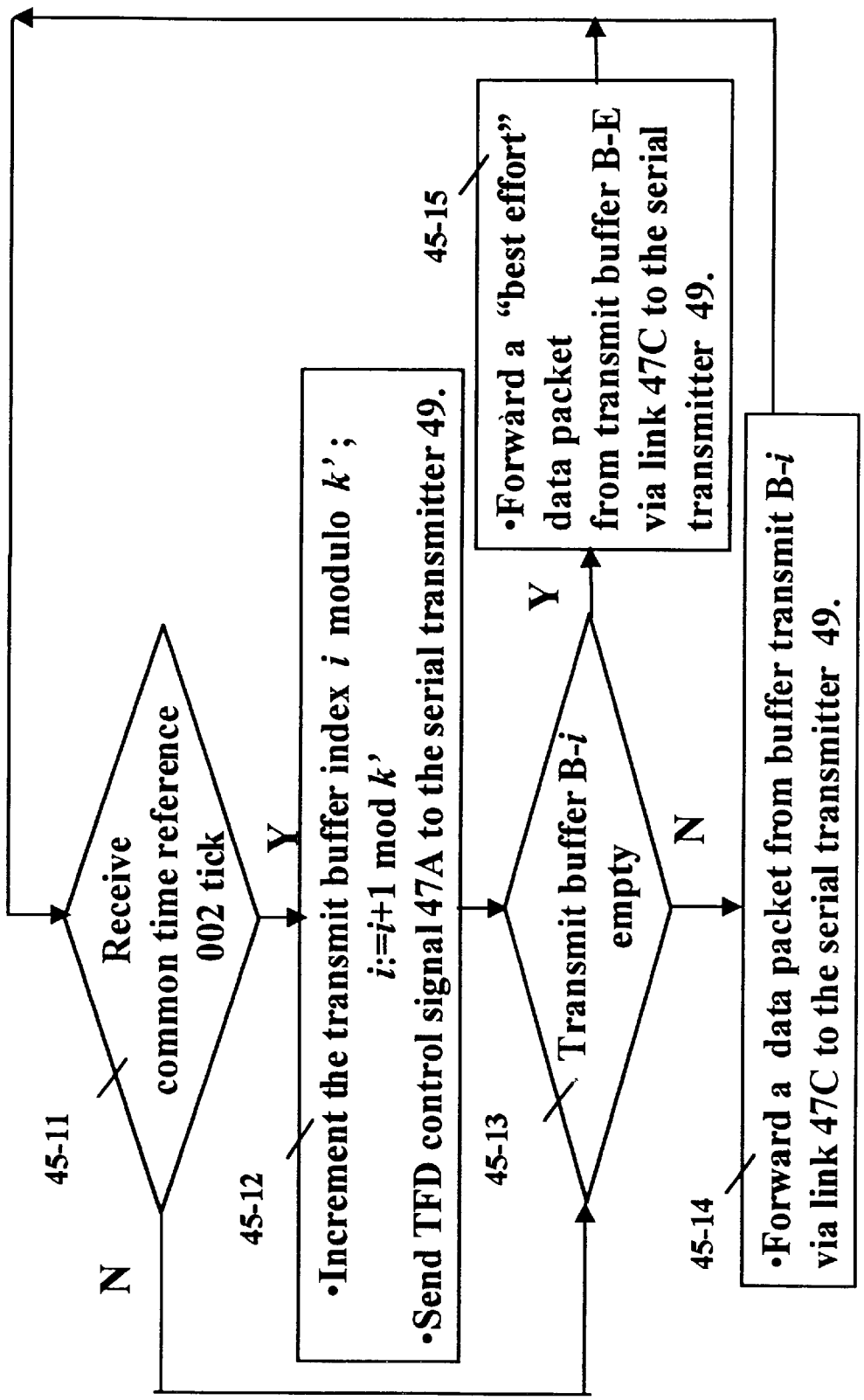
FIG. 12 is a flow diagram illustrating the operation of the select buffer and time-driven preemption controller of the present invention.

Referring to FIGS. 10–12, the scheduling controller and transmit buffer 45 operation and structure are described. As shown in FIG. 10, the scheduling controller and transmit buffer 45 comprises a data packet scheduling controller 45A coupled to transmit buffers 45C via connections 45-1, 45-2, . . . 45-k', and 45-be. The transmit buffers 45C are coupled via connections 47-1, 47-2, . . . 47-k', and 47-be to the select buffer and time-driven preemption controller 45D.

The data packet scheduling controller 45A, together with the select buffer and time-driven preemption controller 45D, perform the mapping, using the PID 35C and the data packet time of arrival (ToA) 35T information in order to determine the respective time frame a respective data packet should be forwarded out of the output port. Both controllers 45A and 45D are constructed of a central processing unit (CPU), a random access memory (RAM) for storing the data, and read only memory (ROM) for storing the respective controller processing programs. The data packet scheduling controller 45A additionally comprises a forwarding table 45B.

Data packets arrive from the switching fabric 50 (not shown) via link 51. Data packets which have high priority, as determined by priority indicator 35P, are switched by the scheduling controller 45A to one of the k' transmit buffers 45C (B-1, B-2, . . . , B-k'). Each of the transmit buffers is designated to store data packets that will be forwarded in each of the respective time frames in every time cycle, as shown in FIG. 4. Data packets which have low priority, as determined by priority indicator 35P, are switched by the scheduling controller 45A to the transmit buffer B-E for "best effort" transmission. Low priority traffic is non-reserved and may include "best effort" traffic and rescheduled data packets.

The common time reference (CTR) signal 002 is coupled to the data packet scheduling controller 45A and the select buffer and time-driven preemption controller 45D and provides for timely transmission of outgoing data packets.

The flow chart for the program executed by the data packet scheduling controller 45A is illustrated in FIG. 11. When the data packet is received from the switch fabric 50 at step 45-03, the PID 35C and the time stamp 35TS in the data packet header are used to look-up the forward parameter 45F in the forwarding table 45B, as specified in step 45-04. Next, the index i of the transmit buffer 45C, between B-1 and B-k', is computed in step 45-05 by subtracting the time of arrival ToA 35T from the common time reference CTR 002 and by adding the forward parameter 45F. As shown in step 45-06, after the index i is computed, it is used to schedule the data packet from the switch fabric to transmit buffer B-i.

The flow chart for the program executed by the select buffer and time-driven preemption controller 45D is illustrated in FIG. 12. The controller 45D determines if a common time reference (CTR) tick 002 is received at step 45-11. If the common time reference tick is received, step 45-12 increments the transmit buffer index i (i.e., i:=i+1 mod k', where k' is the number of buffers for scheduled traffic, one for each time frame in a time cycle). The controller 45D also sends a time frame delimiter TFD to the serial transmitter at step 45-12.

At step 45-13 the transmit buffer B-i is checked to see if it is empty. If it is not empty, step 45-14 forwards the data packet present in transmit buffer B-i via link 47C to transmitter 49. If the determination of step 45-13 is that transmit buffer B-i is empty, then time frame i is available for best-effort traffic. For best-effort traffic, step 45-15 forwards the data packet present in transmit buffer B-E via link 47C to transmitter 49.

Figure 13:
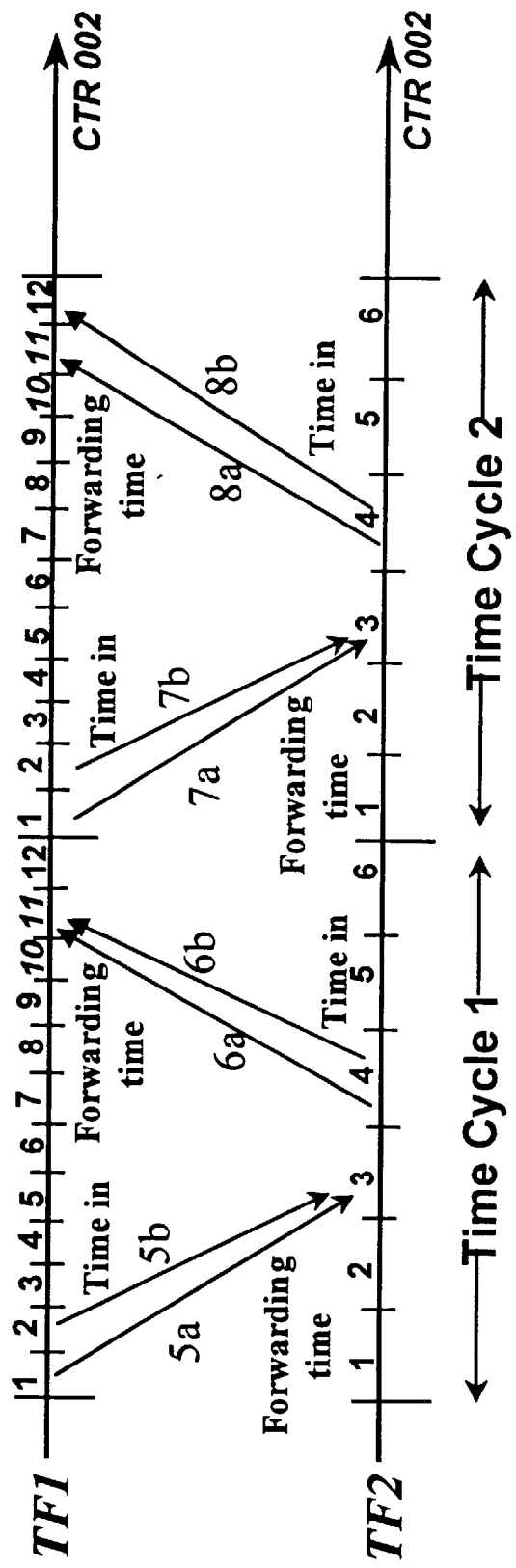
FIG. 13 is a timing diagram illustrating timely periodic transmission of data packets across multiple time bases as in the present invention.

FIG. 13 is a timing diagram illustrating timely periodic transmission of data packets across multiple time bases as in the present invention. Horizontal axis TF1 represents the timing of a communications link having a time frame duration of k1. In the illustrated example, k1 is chosen to permit 12 time frames within one time cycle. Horizontal axis TF2 represents the timing of a communications link having a time frame duration of k2. In the illustrated example, k2 is chosen to permit 6 time frames within one time cycle. Horizontal axes TF1 and TF2 are aligned in time relative to the common time reference signal 002, thus the start of time frame 1 on horizontal axis TF1 is coincident with the start of time frame 1 on the horizontal axis TF2. The relationship between TF1 and TF2 is generically given by the equation TF2=(k1/k2 )*TF1, in which the ratio (k1/k2) can be simplified to the term k. FIG. 13 shows an example of two timing diagrams where the term k is equal to 2.

Transferring data from the communications link having shorter time frame durations (e.g, TF1) to the communications link having longer time frame durations (e.g., TF2) where k=2 is illustrated as transfers 5a, 5b, 7a, and 7b. Data packets 5a arriving in time frame 1 (time cycle 1) of a first communications link having shorter time frame durations (e.g., TF1) are scheduled by the scheduling controller to be output on a second communications link having longer time frame durations (e.g., TF2) at time frame 3, as illustrated. Similarly, data packets 5b arriving in time frame 2 of the same first communications link are scheduled by the scheduling controller to be output on the same second communications link also at time frame 3, as illustrated. The process is cyclic within time cycles, thus the pattern of data packet transfer observed at 5a, 5b in time cycle 1 is duplicated at for data packet transfers 7a, 7b in time cycle 2. There is no ambiguity involved in the transfer from a communications link having shorter time frame durations to a communications link having equal or longer time frame durations (e.g., when k=≧1). The time frame to which the data packet is transferred to is determined solely by the ratio (k1/k2) or equivalent term k, the scheduled switch fabric transit delay, and the time frame in which it arrives. Thus the time frame in a communications link having longer time frame durations in which to schedule a data packet from a time frame in a communications link having shorter time frame durations is determined by the equation of the form $tf_{schedulelonger}=\text{INTEGER}((tf_{arrivalshorter}-1)/k)+\text{delay}_{fabric}+1$.

Transferring data from the communications link having longer time frame durations (e.g., TF2) to the communications link having longer time frame durations (e.g., TF1) where k=2 is illustrated as transfers 6a, 6b in time cycle 1, and 8a, and 8b in time cycle 2, and is slightly more complex than the transfers discussed above because the equivalent equation of the form $tf_{scheduleshorter}=\text{INTEGER}(k(tf_{arrivallonger}-1+\text{delay}_{fabric}+1))$ cannot reach some of the shorter output link time frames when k>1. To reduce the effects of congestion, the shorter output link time frame may need to be adjusted as in the equation of the form $tf_{sheduleshorter}=\text{INTEGER}(k(tf_{arrivallonger}-1+\text{delay}_{fabric}+1))+tf_{adjustment}$, where $tf_{adjustment}$ is selected to distribute data packets over a subset of the longer output link time frames.

As is shown in FIG. 13, data packets 6a arriving in time frame 4 of a first communications link having longer time frame durations (e.g, TF2) are scheduled by the scheduling controller to be output on a second communications link having shorter time frame durations (e.g., TF1) at time frame 11 or 12, as illustrated, wherein the example shown selects $tf_{adjustment}$ such that the data packets are output during time frame 11. Similarly, data packets 6b also arriving in time frame 4 of the same first communications link are scheduled by the scheduling controller to be output on the same second communications link, wherein the example shown selects $tf_{adjustment}$ such that the data packets are also output during time frame 11 as with 6a. The process is not necessarily cyclic within time cycles, thus the pattern of data packet transfer observed at 6a, 6b may not be duplicated at for data packet transfers 8a, 8b. Data packets 8a arriving in time frame 4 of a first communications link having longer time frame durations (e.g., TF2) are scheduled by the scheduling controller to be output on a second communications link having shorter time frame durations (e.g., TF1) at time frame 11 or 12, as illustrated, wherein the example shown selects $tf_{adjustment}$ such that the data packets are output during time frame 11. Data packets 8b also arriving in time frame 4 of the same first communications link are scheduled by the scheduling controller to be output on the same second communications link, wherein the example shown selects $tf_{adjustment}$ such that the data packets are instead output during time frame 12. Thus it is shown by FIG. 13 that a data packet going from a communications link with a longer time frame duration to a communications link with a shorter time duration may be dynamically scheduled in one of a plurality of the shorter duration time frames in each time cycle, and that a data packet going in the opposite direction (i.e., from shorter time frame duration to longer time frame duration) can be scheduled in a fixed output link time frame.

The actual equations used to place data packets within time frames have to be adjusted slightly to account for the fact that a data packet arriving in one time frame of a first time cycle may be scheduled across time cycle boundaries to be transmitted in a time frame within next time cycle, wherein the transmitted time frame may be lower in number than the arrival time frame. These kinds of adjustments are described in detail below.

Figure 14:
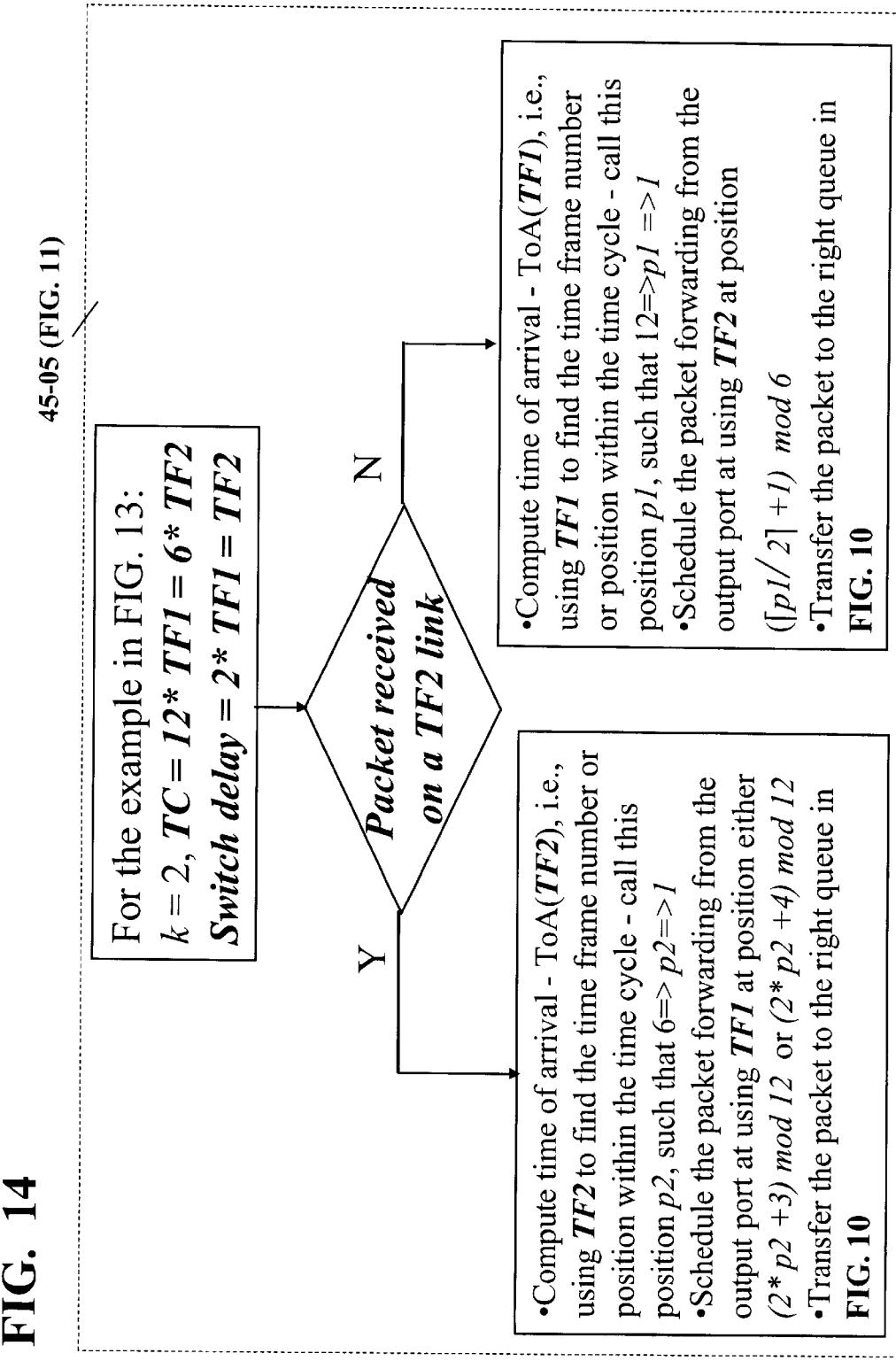
FIG. 14 is a flow diagram illustrating additional detail of the operation of the scheduling controller of the present invention.

FIG. 14 is a flow diagram illustrating additional detail of the operation of the scheduling controller of the present invention. The numerical values in the flow diagram correspond to the example timing diagram shown in FIG. 13. Note that the numerical examples are merely an illustration and the invention is not limited to the numerical values shown. Specifically, k need not be an integer, and k1 and k2 may each be different from the values shown. FIG. 14 illustrates one embodiment for calculating the effective $tf_{adjustment}$ value for an equation of the form $tf_{scheduleshorter} = INTEGER(k(tf_{arrivallonger}-1+delay_{fabric}+1))+tf_{adjustment}$. Flow starts in FIG. 14 with a determination of whether the data packet to be scheduled is received from a link with shorter or longer time frame durations. If the data packet is received from a communications link with shorter time frame durations (e.g., TF1 of FIG. 13), then the time frame of arrival (i.e., ToA) of the shorter time frame duration is used to determine the output time frame within the communications link of the longer time frame duration. The ToA value is the time frame number within the time cycle, and thus cannot be less than one and cannot be greater than the number of time frames in a time cycle (e.g., $num_{tf}$). Thus the output time frame number is simply $tf_{schedulelonger}=((ToA)/k)$ mod $num_{tflonger}+1$, thus (ToA/2) mod 6+1.

If the data packet is received from a communications link with longer time frame durations (e.g., TF2 of FIG. 13), then the time frame of arrival (i.e., ToA) of the longer time frame duration is used to determine the output time frame within the communications link of the shorter time frame duration. The ToA value is the time frame number within the time cycle, and thus cannot be less than one and cannot be greater than the number of time frames in a time cycle (e.g., $num_{tf}$). In the illustrated example, $1 \leq ToA \leq 6$, and k=2, thus two equations can be used to schedule the output time frame: a first equation (a) $tf_{scheduleshorter}=(k(ToA)+0+delay_{fabric})$ mod $num_{tfshorter}+1$ and a second equation (b) $tf_{scheduleshorter}=(k(ToA)+1+delay_{fabric})$ mod $num_{tfshorter}+1$. Thus for the example shown, the equations reduce to (a) $tf_{scheduleshorter}=(2(ToA)+3)$ mod 12+1 and (b) $tf_{scheduleshorter}=(2(ToA)+4)$ mod 12+1.

Figure 15:
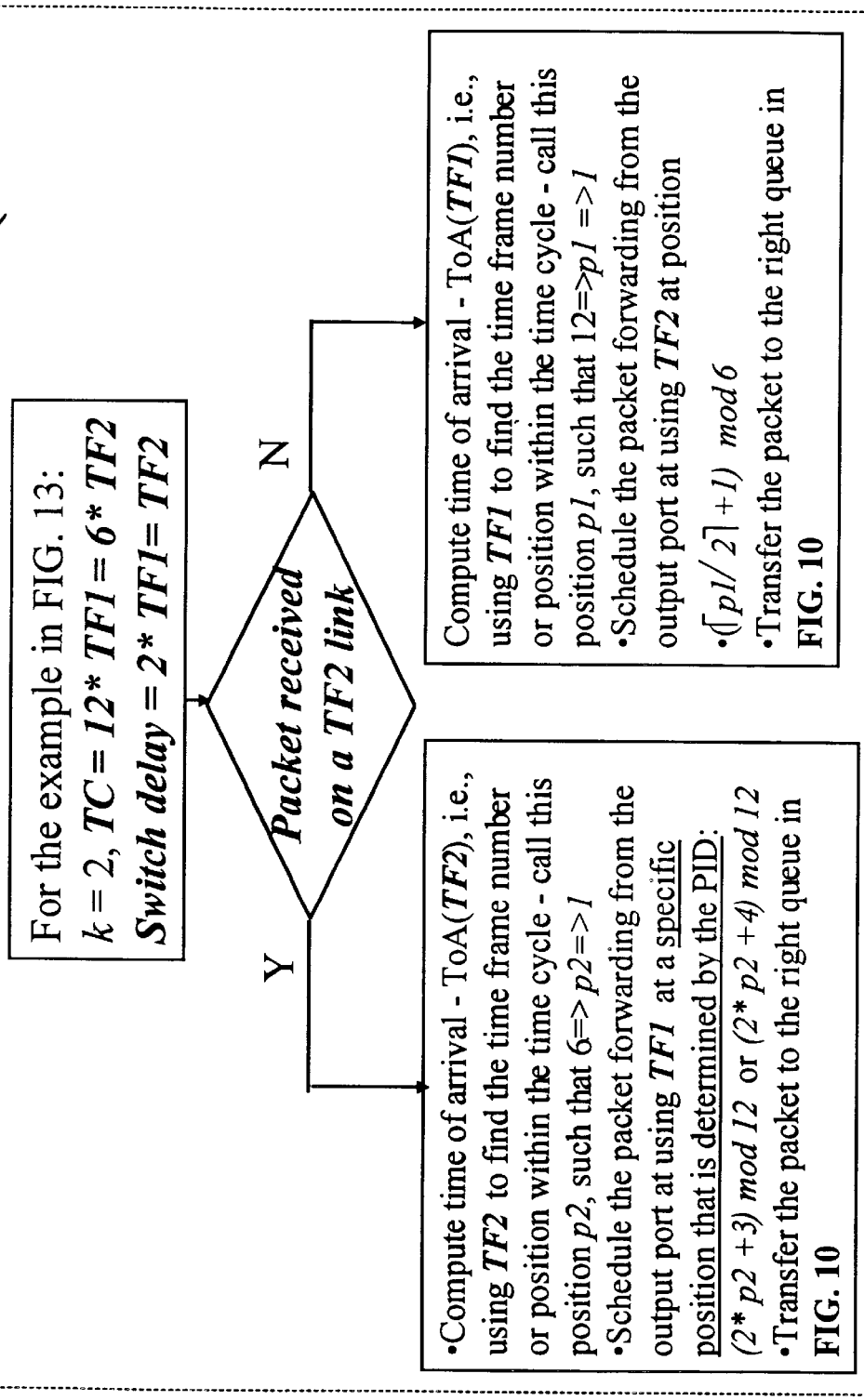
FIG. 15 is a flow diagram illustrating additional detail of the operation of an alternate embodiment of the scheduling controller of the present invention.

When k>1 and a data packet must go from a communications link of longer time frame durations to one of shorter time frame durations, in a preferred embodiment there are at least INTEGER(k+1) possible output link time frames and thus INTEGER(k+1) possible equations. In an alternate embodiment, one equation with a variable term (e.g., $tf_{adjustment}$, where $tf_{adjustment}$ varies from 1 to INTEGER(k+1)) may be used. In all embodiments, a selection has to be made to determine which of the set of permissible outgoing time frames will be selected. In a preferred embodiment, the choice in the set is determined by one or more fields in the RTP header of the data packet. In another embodiment, the choice in the set is determined by the pipe ID (PID). In yet another embodiment, the choice in the set is determined on a space available basis. In an alternate embodiment, the selection may be determined by fields in the common time reference signal. FIG. 15 is a flow diagram illustrating additional detail of the operation of an alternate embodiment of the scheduling controller of the present invention, similar to that shown in FIG. 14, wherein the choice in the set of shorter duration output time frames is determined by the PID.

Figure 16:
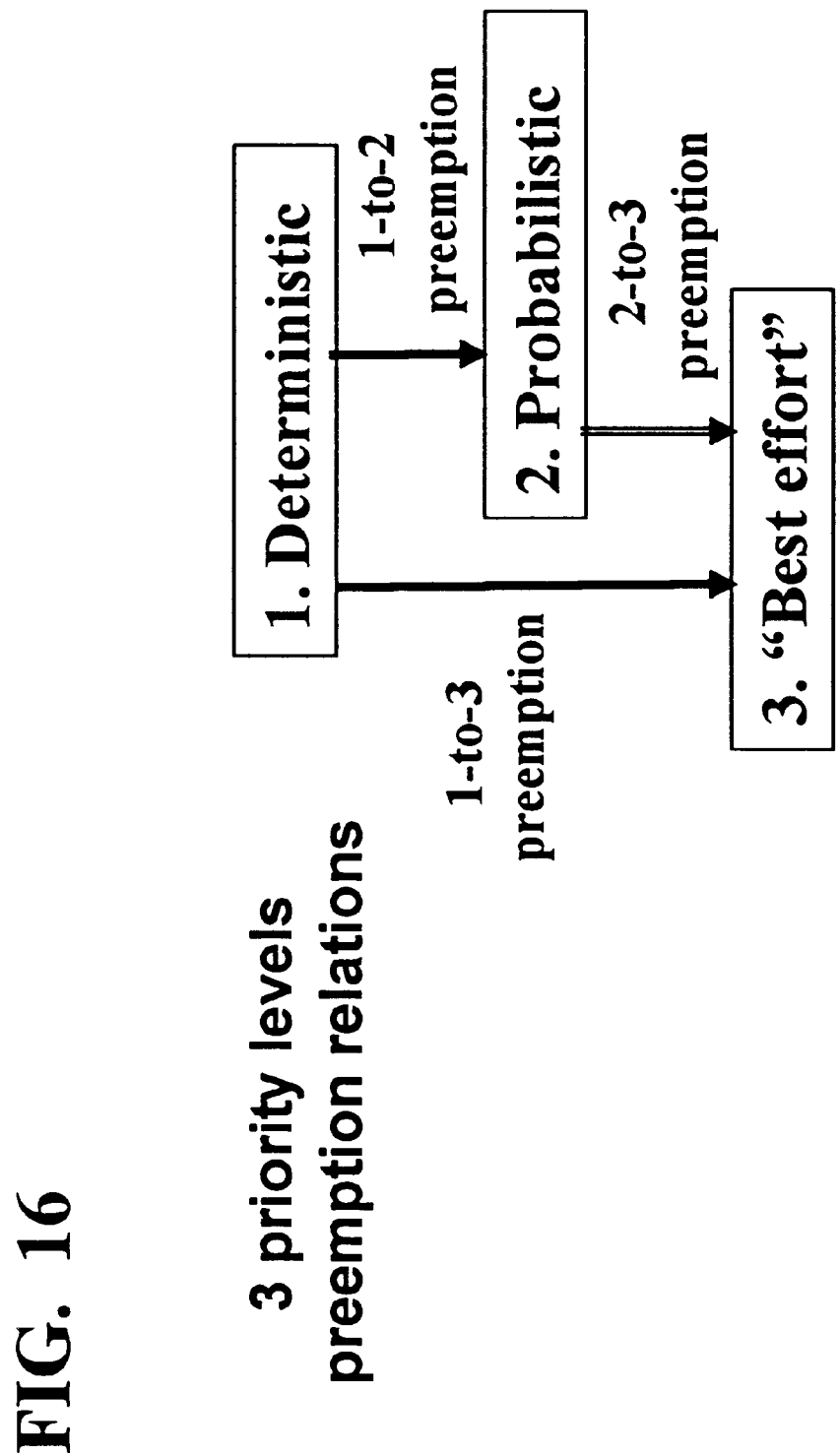
FIG. 16 illustrates the multilevel protocol used to preempt data packets as used in the present invention.

FIG. 16 illustrates the multilevel protocol used to preempt data packets as used in the present invention. Preemption is required when multiple data packets may be scheduled for transmission during the same time frame or interval of time frames. Typically the scheduling algorithm will arrange the schedules of data packet traffic so that preemption is not required. However, communications links of different bandwidth introduce particular problems in communication of data packets with different priority levels that cannot be resolved within the scope of a typical synchronous virtual pipe or a synchronous virtual network. Specifically, one possible problem is that a large data packet of lower priority may be scheduled to start in a particular time frame. If this packet transmission cannot be completed within this time frame (because of a low link speed) when the next time frame starts it may be necessary to preempt the transmission of the low priority packet. Because the preemption coincides with the start of a time frame it is called time-driven preemption. Selective preemption in the present invention permits lower priority traffic to be preempted while in mid-transmission, thus permitting the higher priority traffic to be forwarded first.

As shown in FIG. 16, priorities of data packet traffic are divided up into a plurality of categories; in the preferred embodiment, three categories are used corresponding respectively to deterministic traffic, probabilistic traffic, and "best effort" traffic. Deterministic traffic is considered the highest priority level traffic can is permitted to preempt both probabilistic and "best effort" traffic. Probabilistic traffic is permitted to preempt only "best effort" traffic, and "best effort" traffic is never permitted to preempt any other kind of traffic.

FIG. 17A details the protocol used to non-destructively preempt data packets as used in the preferred embodiment of the present invention. Control signal pairs are used to indicate the start i and end i of any data packet i. Additional control signals are used to. indicate preempt j, resume j, and abort j, for a higher priority packet j. All control signals can be realized with the control codewords of FIG. 5C.

For a data packet 1 in transit, the transmission starts with a start 1 control signal followed by the start of data transmission of the contents of data packet 1. If the transmission of data packet 1 must be preempted by a higher priority data packet 2, control signals preempt 1 and start 2 are sent, followed by the start of data transmission of the contents of higher priority data packet 2. Upon successful completion of higher priority data packet 2, the control signals end 2 and resume 1 are sent, and transmission of the remainder of data packet 1 is resumed. FIG. 17B is a timing diagram illustrating an example preemption as just described, wherein the data packet 1 is of "best effort" priority and higher priority data packet 2 is one of deterministic or probabilistic priority.

FIG. 17C is a timing diagram illustrating another example preemption as provided by the present invention, wherein a probabilistic packet 3 starts with transmission start 3 and followed by data transmission until a deterministic data packet must preempt it. The preemption is indicated by a preempt 3 and a start 4 control signal pair, followed by the transmission of deterministic data packet 4. Upon completion of data packet 4, an end 4 and resume 3 control signal pair are sent and transmission of data packet 3 resumes.

In the preferred embodiment, a "best effort" data packet may be preempted by a probabilistic data packet, which in turn may be preempted by a deterministic data packet. Also in the preferred embodiment, any lower priority packet may be interrupted any number of times by each of a plurality of higher priority packets. It is thus possible that a lower priority data packet may be preempted so many times that the information it contains is considered stale and no longer worthy of transmission. In that event, the schedule controller may generate an abort i control signal in lieu of a resume i control signal, thus aborting transmission of lower priority packet i.

FIG. 18A is an illustration of determination of the time-of-arrival of data packets in a first time base having a time frame duration of TF1. A first data packet is shown arriving starting somewhere within a first time frame at start of packet 1 SoP1. The first data packet is sufficiently long to require transmission to continue well into a second time frame, at which point the transmission of the first data packet completes at end of packet 1 EoP1. A second packet is shown with transmission starting at SoP2 and ending at EoP2, both starting and ending within the same time frame. Thus it is shown that a packet may be transmitted entirely within one time frame, and alternatively the transmission may span multiple time frames.

FIG. 18B is an illustration of determination of the time-of-arrival of data packets in a second time base having a time frame duration of TF2. A first packet is shown with transmission starting at Start of Packet 3 SoP3 and ending at End of Packet 3 EoP3, both starting and ending within the same time frame. A second data packet is shown arriving starting somewhere within a time frame at SoP4. The second data packet of FIG. 18B is sufficiently large to require transmission to continue well into a later time frame, at which point the transmission of the second data packet completes at end of packet 4 EoP4. Thus it is shown that a data packet may be transmitted entirely within one time frame, and alternatively the transmission may span multiple time frames.

FIGS. 18A and 18B in combination show that data packets may span multiple time frames, regardless of the duration of the time frame selected for any particular communications link. It should be evident that the ability to designate a clear and consistent identification of time frames associated with a data packet is required; in the preferred embodiment of the present invention, the position of the first bit of the transmission of a data packet uniquely determines the time frame associated with the data packet, regardless of the length of the data packet, the duration of the time frame, and how many time frames may be required to transmit the data packet in full.

The present invention provides a system for scheduling and managing data transfer of data packets from at least one source to at least one destination. Transfer of data packets occurs during a plurality of predefined time intervals or time cycles, where each time interval in turn is comprised of some number of time frames. Two or more switches are linked to form a path using uniquely addressable input and output ports of each switch. The switches may form a network of any general network topology, including stars, rings, buses, bidirectional loops, and others well known to those skilled in the art of computers and communications networks. The present invention utilizes a common time reference made available to some of the switches in the network; the common time reference and the interconnections of the switches thus combine to permit the construction of virtual synchronous pipes for transfer of data packets over communications links. The duration of a time frame may be different in different parts of the system, and in the preferred embodiment of the present invention there are at least two different time frame durations in use concurrently.

Data packets are conveyed from switch to switch over communications links. Within each switch, a scheduling time assignment determines the time frame to transmit the data packet for the next leg of the journey, where the time frame for the next leg may have a different duration that the time frame duration of the immediately previous leg of the journey. The scheduling time assignment provides for a consistent fixed interval between the time a data packet enters a synchronous virtual pipe and the time it leaves the synchronous virtual pipe, regardless of the number of different time frame durations employed at different switches and communications links in that synchronous virtual pipe.

For scheduling of data transfer between two synchronous virtual pipes, and if they have different time frame durations, it is convenient to pick those time frame durations and numbers of time frames per time cycle so that they share the same time cycle duration and super-cycle duration. If two synchronous virtual pipes have different time frame durations and different time cycle durations, the respective durations and numbers of time frames and time cycles within a super-cycle should be selected to permit both synchronous virtual pipes to share the same overall super-cycle duration. It is convenient in the preferred embodiment to select a super-cycle duration of one UTC second.

The present invention includes means for non-destructive adjusting transmission of data packets, including any already in progress of transmission, to permit higher-priority traffic to get through. A time-driven preemption means permits lower priority scheduled traffic to be preempted indefinitely until higher priority traffic has been serviced. Control words are used as in-band signalling to indicate data packet start, end, and preemption as necessary. Lower priority data packets that are interrupted or preempted can be non-destructively resumed at the point of interruption or they can be aborted.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for scheduling and managing data transfer of data packets from at least one source to at least one destination over a network with a plurality of switches, wherein the transfer of the data packets is provided during respective ones of a plurality of predefined time intervals, wherein each of the predefined time intervals is comprised of a plurality of predefined time frames, wherein the time frames have at least one predefined duration, said system comprising:

a common time reference signal coupled to all selected ones of said switches, wherein the common time reference is partitioned into time frames of at least one predefined duration;

wherein the selected ones of said switches have a plurality of uniquely addressable input ports and output ports, for receiving and transmitting the data packets;

wherein each of the respective data packets starts to be received during a first one of the time frames which has a first predefined duration by a first input port of a first switch from the selected ones of said switches, and starts to be transmitted during a second one of the time frames which has a second predefined duration by a first output port of the first switch;

wherein each of the respective data packets starts to be received during a third one of the time frames which has a third predefined duration, by a second input port of a second switch from the selected ones of said switches, and starts to be transmitted during a fourth one of the time frames which has a fourth predefined duration, by a second output port of the second switch;

wherein the first switch and the second switch are interconnected via a sequence of communication links in a path;

a first scheduling controller in the first switch for mapping from a first predefined time frame with the first predefined duration, within which the respective data packet is transferred into the respective switch, to a second predefined time frame with the second predefined duration, within which the respective data packet is transmitted out of the respective switch, wherein the scheduling controller is responsive to the common time reference signal;

a second scheduling controller in the second switch for mapping from a third predefined time fame with the third predefined duration, within which the respective data packet is transferred into the respective switch, to a fourth predefined time frame with the fourth predefined duration, within which the respective data packet is transmitted out of the respective switch, wherein the second scheduling controller is responsive to the common time reference signal; and wherein there is at least one predefined time interval between at least one of the following: the first predefined time frame and the third predefined time frame, the first predefined time frame and the fourth predefined time frame, the second predefined time frame and the third predefined time frame, the second predefined time frame and the fourth redefined time frame.

2. The system as in claim 1, wherein the common time reference signal is in accordance with the Coordinated Universal Time (UJTC) standard.

3. The system as in claim 1, wherein the time frames of the third predefined duration are of different duration than the time frames of the fourth predefined duration.

4. The system as in claim 1, wherein the time frames of the first predefined duration are of different duration than the time frames of the second predefined duration.

5. The system as in claim 1,
wherein a predefined number of contiguous time frames comprise a time cycle;
wherein there are a plurality of time cycles that are contiguous; and
wherein the first scheduling controller and second scheduling controller select respective predefined time frames within each of the respective time cycles to transmit the respective data packet.

6. The system as in claim 1,
wherein a first number of contiguous time frames of the first predefined duration comprise a time cycle of a fifth predefined duration;
wherein the time cycles of the fifth predefined duration are contiguous;
wherein a second number of contiguous time frames of the second predefined duration comprise a time cycle of a sixth predefined duration;
wherein the time cycles of the sixth predefined duration are contiguous; and
wherein the first scheduling controller selects a predefined time frame within each of the cycles to transmit the respective data packet.

7. The system as in claim 6, wherein the time cycle of the fifth predefined duration is equal to the time cycle of the sixth predefined duration.

8. The system as in claim 6, wherein the time cycle of the fifth predefined duration is larger than the time cycle of the sixth predefined duration.

9. The system as in claim 6, wherein the time cycle of the fifth predefined duration is smaller than the time cycle of the sixth predefined duration.

10. The system as in claim 1,
wherein a first number of contiguous time frames of the first predefined duration comprise a time cycle of a fifth predefined duration;
wherein the time cycles of the fifth predefined duration are contiguous;
wherein a second number of contiguous tine frames of the second predefined duration comprise a time cycle of a sixth predefined duration;
wherein the time cycles of the sixth predefined duration are contiguous;
wherein a third number of time cycles of the fifth predefined duration comprise a first super cycle;
wherein the first super cycles are contiguous;
wherein a fourth number of time cycles of the sixth predefined duration comprise a second super cycle;
wherein the second super cycles are contiguous; and
wherein each of the first and second scheduling controllers selects a predefined time frame within each of the super cycles to transmit the respective data packets.

11. The system as in claim 10, wherein the first super cycle and the second super cycle have equal durations.

12. The system as in claim 10, wherein the first super cycle and the second super cycle start at a same time with respect to the common time reference.

13. The system as in claim 10, wherein the first super cycle and the second super cycle have different durations.

14. The system as in claim 1, wherein a predefined number of contiguous time frames comprise a time cycle;
wherein there are a plurality of time cycles that are contiguous;
wherein a fixed number of a plurality of contiguous ones of the time cycles comprise a super cycle; wherein the super cycle is periodic; and
wherein each of the first and second scheduling controllers selects a predefined time frame within each of the super cycles to transmit the respective data packets.

15. The system as in claim 1, wherein the common time reference signal is coupled from a Global Positioning System (GPS);
wherein the coupling from GPS is at least one of the following: directly to selected ones of said switches, directly to selected ones of said input ports, directly to selected ones of said out ports, indirectly to selected ones of said switches, indirectly to selected ones of said input ports, indirectly to selected ones of said out ports, indirectly to selected ones of said switches via adjacent switches, indirectly to selected ones of said input ports via adjacent switches, indirectly to selected ones of said out ports via adjacent switches, indirectly to selected ones of said switches via adjacent network interfaces, indirectly to selected ones of said input ports via adjacent network interfaces, indirectly to selected ones of said out ports via adjacent network interfaces.

16. The system as in claim 1, wherein the position of a beginning of said data packet within each time frame is at least one of the following: in an arbitrary position, in a predefined position.

17. The system as in claim 15, wherein the super cycle duration is equal to at least one of the following: one second as measured using the Coordinated Universal Time (UTC) standard, a fraction of a second as measured using the Coordinated Universal Time (UTC) standard, a predefined number of seconds as measured using the Coordinated Universal Time (UTC) standard.

18. The system as in claim 1, further comprising:
a plurality of virtual pipes;
wherein each of the virtual pipes has at least two of the switches interconnected via a sequence of communication links in a path;
wherein for each switch within one of the virtual pipes there is a fifth predefined time frame within which a respective beginning of data packet is transferred into the respective switch, and a sixth predefined time frame within which the respective beginning of data packet is forwarded out of the respective switch.

19. The system as in claim 18, wherein the transmission over each of said communication links is provided during a time frame with a duration selected from a plurality of predefined time frame durations.

20. The system as in claim 18, wherein the mapping by the first scheduling controller provides consistent fixed time intervals between the input to and output from at least a selected one of the plurality of virtual pipes.

21. The system as in claim 18, wherein each link of each of the virtual pipes has a selected one of a plurality of the predefined time frame durations.

22. The system as in claim 18,
wherein a predefined number of contiguous time frames of the fifth predefined duration comprise a time cycle of a seventh predefined duration;
wherein the time cycles of the seventh predefined duration are contiguous;
wherein a predefined number of contiguous time frames of the sixth predefined duration comprise a time cycle of a eighth predefined duration;
wherein the time cycles of the eighth predefined duration are contiguous;
wherein a predefined number of contiguous time frames of a ninth predefined duration comprise a time cycle of a tenth predefined duration;
wherein the time cycles of the tenth predefined duration are contiguous; and
wherein the transmission over at least a selected one of the plurality of virtual pipes utilizes at least one of a time cycle of the seventh predefined duration, a time cycle of the eighth predefined duration, and a time cycle of the tenth predefined duration.

23. The system as in claim 22,
wherein there are a plurality of different time frame durations; and
wherein there are a plurality of different time cycle durations.

24. The system as in claim 4, wherein the first scheduling controller maps the respective data packet received during the tint predefined time frame for output during a selected one of the second predefined time frames in which the respective data packet is scheduled to be forwarded out of the respective switch.

25. The system as in claim 1, wherein the scheduling controller maps the data packet to one of a plurality of predefined ones of the second predefined time frames in which the respective data packet is scheduled to be forwarded out of the respective switch.

26. The system as in claim 4, wherein the scheduling controller maps the data packet, from one of a plurality of the first predefined time frames within which a respective data packet is transferred into the respective switch, to the second predefined time frame in which the respective data packet is scheduled to be transmitted out of the respective switch.

27. The system as in claim 4, wherein the scheduling controller maps the data packet, from one of a plurality of the first predefined time frames within which a respective data packet is transferred into the respective switch, to one of a plurality of the second predefined time frames within which the respective data packet is scheduled to be transmitted out of the respective switch.

28. The system as in claim 1, wherein the respective one of the first and second scheduling controllers maps the respective data packet to be forwarded out of the respective switch, during a plurality of predefined ones of the second predefined time frames.

29. The system as in claim 1, wherein the data packet is received during a sequence of a plurality of first predefined time frames.

30. The system as in claim 29, wherein the scheduling controller maps the data packet according to the first time frame in said sequence of the plurality of first predefined time frames.

31. A switching system for scheduling and managing data transfer, during at least one of a plurality of consecutive time frames having boundaries, of a plurality of data packets of at least a first priority and a second priority, from at least one source to at least one destination, the system comprising:
a plurality of switches with plurality of uniquely addressable input ports and output ports, for receiving and transmitting the data packets;
means for scheduling the data packets for transmission out of the output port;
a select buffer and time-driven preemption controller for selecting a second priority data packet for active transmission out of the output port when there is no first priority data packet scheduled for a given respective one of the time frames;
detection means for detecting boundaries between two consecutive time frames, and for detecting an overlap of an active transmission of the second priority data packet into a second time frame relative to a scheduled transfer of at least one first priority data packet during said second time frame, to provide a time-driven preemption signal;
preemption logic, responsive to the time-driven preemption signal, for interrupting the overlapping active transmission from the respective output port of the respective second priority data packet, and for marking the respective second priority data packet as to where the transfer was interrupted, and for initiating active transmission of at least one scheduled first priority data packet, and for providing a completion signal upon completion of the scheduled transfer of at least one scheduled first priority data packet; and
resumption logic, responsive to the completion signal, for resuming the active transmission of the respective second priority data packet from the marking where the transfer was interrupted.

32. The system as in claim 31, wherein the first priority data packets are further characterized as at least one of Constant Bit Rite (CBR) and Variable Bit Rate (VBR) data packets.

33. The system as in claim 31,
wherein the first priority data packets are further comprised of a high first priority and a low first priority;
wherein the system is further comprised of a first priority select buffer and time-driven preemption controller for first selecting the high first priority data packet for active transmission, if available, and if not available, for then selecting the low first priority data packet for active transmission; and
wherein the select buffer and time-driven preemption controller selects the second priority data packet when there is no high first priority data packet and no low first priority data packet scheduled for the given respective one of the time frames.

34. The system as in claim 33, wherein the preemption logic is responsive to the preemption signal, for interrupting the overlap active transmission from the output port of the low first priority data packet, and for marking the low first priority data packet as to where the transfer was interrupted, and for initiating active transmission of at least one scheduled high first priority data packet, and for providing a completion signal upon completion of the scheduled transfer of the high first priority data packets; and wherein the resumption logic, responsive to the completion signal, for resuming the active transmission of the low first priority data packet from the marking where the transfer was interrupted.

35. The system as in claim 31, wherein the time frame boundaries are determined responsive to a common time reference (CTR).

36. The system as in claim 35, wherein the common time reference signal is coupled from a Global Positioning System (GPS).

37. A system for scheduling data packets on a plurality of switches, said system comprising:

each switch with a plurality of input ports each having a unique address;

each switch with a plurality of output ports each having a unique address;

a common time reference signal coupled to each of the input ports and output ports, wherein the common time reference at each of the input ports and output ports is partitioned into time cycles;

wherein each time cycle at each of the input ports is partitioned into time frames, wherein each time frame duration at each of the input ports has one of a plurality of predefined durations;

wherein each time cycle at each of the output ports is partitioned into time frames, wherein each time frame duration at each of the output ports has one of a plurality of predefined durations;

a first switching fabric for simultaneously scheduling coupling of incoming data packets between selected ones of the input ports and the output ports responsive to the common time reference, wherein each of the selected input ports has an associated first time frame duration, and wherein each of the selected output ports has an associated second time frame duration;

a second switching fabric for simultaneously scheduling coupling of incoming data packets between selected ones of the input ports and the output ports responsive to the common time reference, wherein each of the selected input ports has an associated third time frame duration, and wherein each of the selected output ports has an associated fourth time frame duration;

wherein responsive to the common time reference there is a predefined time interval between the beginning of at least on of the following: the first time frame duration and third time frame duration, the first time frame duration and fourth time frame duration, the second time frame duration and third time frame duration, the second time frame duration and fourth time frame duration.

38. The systems as in claim 37, wherein one or more data packets can be communicated within each of the time frames.

39. The systems as in claim 37, wherein a predefined number of contiguous first input time frames (i1) of duration d1 at a first input port are grouped into a first input time cycle (ic1), wherein i1 is at least 1;

wherein a predefined number of contiguous second input time frames (i2) of duration d2 at a second input port are grouped into a second input time cycle (ic2), wherein i2 is at least 1;

wherein a predefined number of contiguous third input time frames (i3) of duration d3 at a third input port are grouped into a third input time cycle (ic3), wherein i3 is at least 1;

wherein a predefined number of contiguous first output time frames (o1) of duration t1 at a first output port are grouped into a first output time cycle (oc1), wherein o1 is at least 1;

wherein a predefined number of contiguous second output time frames (o2) of duration t2 at a second output port are grouped into a second output time cycle (oc2), wherein o2 is at least 1;

wherein a predefined number of contiguous third output time frames (o3) of duration t3 at a third output port are grouped into a third output time cycle (oc3), wherein o3 is at least 1;

wherein the scheduling of data packets on the input ports and output ports of the switch have plurality of predefined mappings from selected ones of the input time frames with selected ones of the input time cycles to selected ones of the output time frames within selected ones of the output time cycles.

40. The systemn as in clam 39, further comprising:

a routing controller with a routing table for selecting at least one output port that said respective data packets will be forwarded to;

wherein the routing controller attaches a time of arrival (ToA) to incoming data packets at the input port using the predefined time frame duration and the time cycle associated wit the respective input port;

wherein the time of arrival (ToA) relates to the common time reference and is represented as a time frame number within a time cycle; and wherein the ToA has a unique representation on each of at least the first input port, the second input port, and the third input port.

41. The system as in claim 40, wherein after the incoming data packet is transferred to one of the output ports, the ToA unique representation is utilized to transform to a unique output port representation on each of at least the first output port, the second output port, and the third output port.

42. The system as in claim 41, further comprising:

a memory partitioned into plurality of buffers; and a scheduling controller for selecting one of the plurality of buffers; wherein the unique output port representation is used by the scheduling controller to select one of the plurality of buffers.

43. The system as in claim 42, wherein each of the buffers is uniquely associated with one of the time frames; and wherein selected ones of the buffers determine the selected one of the time frames for the time the data packet to be forwarded from the output port.

* * * * *